(12) United States Patent
Matsueda et al.

(10) Patent No.: US 7,262,871 B2
(45) Date of Patent: Aug. 28, 2007

(54) DATA PROCESSING APPARATUS AND METHOD THAT NOTIFIES A USER WHEN DATA TRANSFERRED

(75) Inventors: Kazutaka Matsueda, Yokohama (JP); Koichi Matsumoto, Tokyo (JP); Soichi Yamamuro, Tokyo (JP); Masaya Kondo, Yokohama (JP); Fumio Shoji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/908,697

(22) Filed: Jul. 20, 2001

(65) Prior Publication Data

US 2001/0040692 A1 Nov. 15, 2001

Related U.S. Application Data

(62) Division of application No. 08/352,883, filed on Dec. 9, 1994, now Pat. No. 6,301,016.

(30) Foreign Application Priority Data

| Dec. 22, 1993 | (JP) | ................................... 5-346640 |
| Dec. 22, 1993 | (JP) | ................................... 5-346648 |
| Dec. 24, 1993 | (JP) | ................................... 5-328043 |
| Dec. 24, 1993 | (JP) | ................................... 5-348285 |

(51) Int. Cl.
*G06F 15/00* (2006.01)
*H04N 1/00* (2006.01)

(52) U.S. Cl. ..................................... 358/1.14; 358/400

(58) Field of Classification Search ................ 358/1.1, 358/1.9, 1.13, 1.14, 1.15, 407, 440, 442, 358/444, 468, 402, 474, 400
See application file for complete search history.

(56) References Cited

U.S. PATENT DOCUMENTS

| 5,027,386 | A |   | 6/1991  | Hisano ........................ 379/100 |
| 5,068,888 | A |   | 11/1991 | Scherk et al. .......... 379/100.11 |
| 5,194,967 | A |   | 3/1993  | Nonomura ................... 358/434 |
| 5,355,230 | A |   | 10/1994 | Kaneko ....................... 358/437 |
| 5,396,341 | A |   | 3/1995  | Takahashi et al. .......... 358/400 |
| 5,552,901 | A |   | 9/1996  | Kikuchi et al. ............. 358/468 |
| 5,557,736 | A | * | 9/1996  | Hirosawa et al. .............. 714/4 |
| 5,859,956 | A | * | 1/1999  | Sugiyama et al. ......... 358/1.13 |
| 5,978,097 | A |   | 11/1999 | Ueno ......................... 358/407 |

* cited by examiner

*Primary Examiner*—Gabriel Garcia
(74) *Attorney, Agent, or Firm*—Fitzpatrick, Cella, Harper & Scinto

(57) ABSTRACT

A data processing apparatus, such as a facsimile apparatus, connected to a LAN, that transmits and/or receives data to or from another apparatus, wherein even if an error or failure such as a printer error or an insufficiency of available space in image memory for storing image data occurs, the required process is continued by transferring the image data from the data processing apparatus to another apparatus also connected to the LAN. The data processing apparatus has the capability of detecting an error in the LAN when the apparatus is connected to the LAN. This allows the data processing apparatus to operate correctly without problems that might otherwise occur due to the error in the LAN. The data processing apparatus also has the capability of operating in an adequate process mode corresponding to a process command contained in a received packet. This allows effective use of the data processing apparatus.

11 Claims, 24 Drawing Sheets

DATA PROCESSING APPARATUS AND METHOD THAT NOTIFIES A USER WHEN DATA TRANSFERRED This application is a division of application Ser. No. 08/352,883, filed on Dec. 9, 1994, now U.S. Pat. No. 6,301,016.

BACKGROUND OF THE INVENTION

1. Field of the Invention

The present invention relates to a data processing apparatus such as a facsimile apparatus having the capability of data communication. More particularly, the present invention relates to a data processing apparatus connectable to another apparatus via a LAN (local area network).

2. Description of the Related Art

Some conventional data processing apparatuses such as a facsimile apparatus have the capability of sending an error message to an another apparatus when an error such as a printer error, insufficiency of free memory area of image data memory for storing image data, etc., occurs in the facsimile apparatus. However, a facsimile apparatus of this type suffers from the problem that the receiving operation stops until the apparatus recovers from the error.

Furthermore, in a conventional facsimile apparatus, when the apparatus receives a large amount of data during image data communication, since the decoding rate is slow compared to the line transmission rate, the receiving memory often becomes busy, and action (such as sending an RNR signal) is taken according to a protocol procedure. As a result, the total communication time becomes longer, and in some cases, the communication is terminated before completion. On the other hand, when the facsimile apparatus transmits a large amount of image data, since the reading rate of its scanner is higher than the transmission rate, memory for storing transmission data often becomes busy, and thus the machine must take action such as stopping the scanner operation.

SUMMARY OF THE INVENTION

In view of the above, it is an object of the present invention to provide a data processing apparatus having the capability of accepting data transmitted by another apparatus even when an error occurs in the data processing apparatus.

It is another object of the present invention to provide a data processing apparatus that can continue the transmission/reception of image data and the data storing operation without prolonging the communication time even when memory for storing image data is busy.

It is still another object of the present invention to provide a data processing apparatus having the capability of detecting an error in a LAN when connected to the LAN.

It is another object of the present invention to provide a data processing apparatus having the capability of transferring image data to another data processing apparatus connected to a LAN depending on the status of the data processing apparatus connected to the LAN.

It is further object of the present invention to provide a data processing apparatus having the capability of receiving image data from another apparatus connected to a LAN.

It is another object of the present invention to provide a data processing apparatus that can be controlled by another apparatus connected to a LAN.

BRIEF DESCRIPTION OF THE DRAWINGS

The above and other objects of the invention will become more apparent from the subsequent detailed description with reference to the accompanying drawings in which.

DESCRIPTION OF THE PREFERRED EMBODIMENTS

First Embodiment

Figure 1:
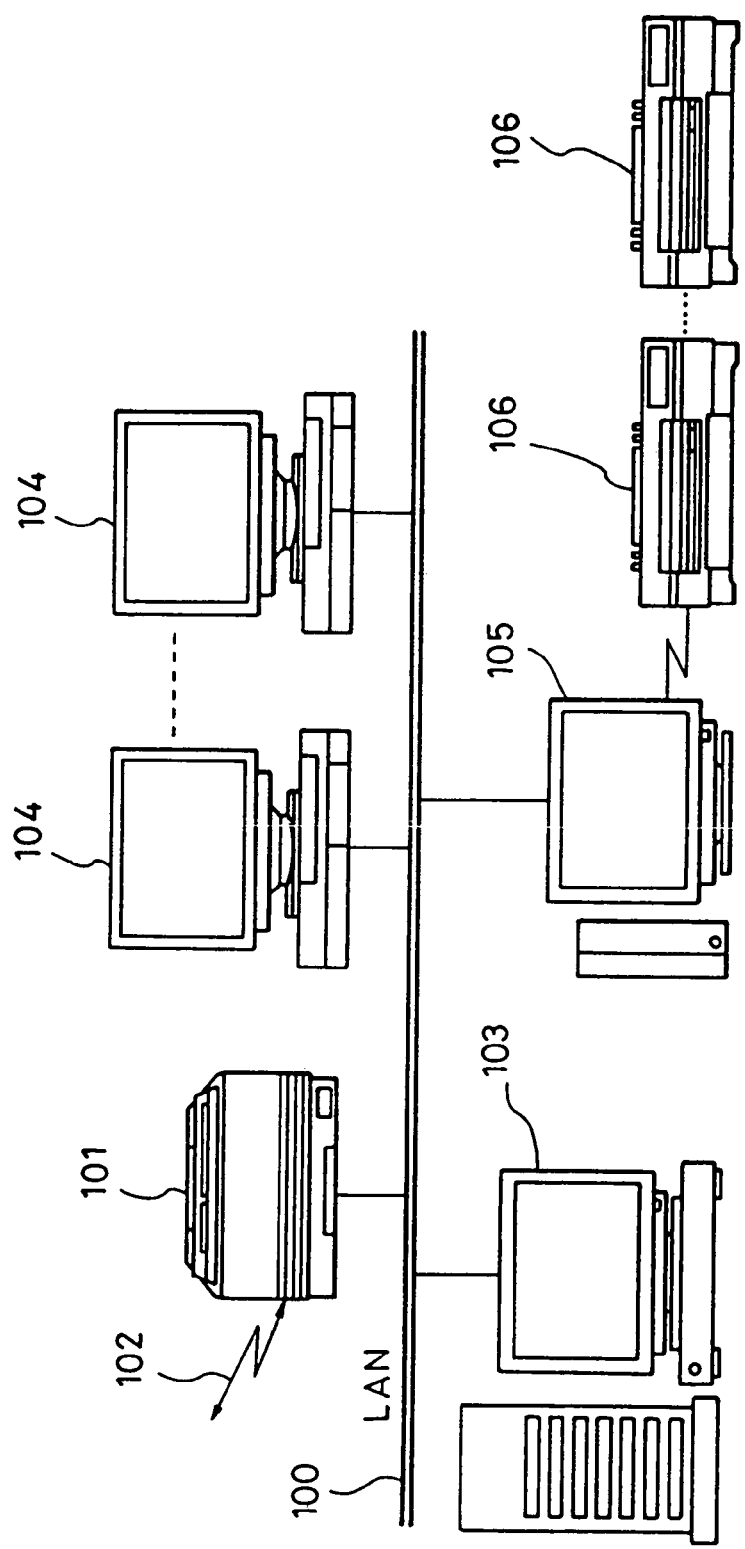
FIG. 1 is a schematic diagram illustrating a facsimile apparatus according to an embodiment of the present invention wherein the facsimile apparatus is connected to a LAN.

FIG. 1 is a schematic diagram illustrating a system construction to which a facsimile apparatus according to an embodiment of the present invention is applied.

The facsimile apparatus 101 according to the present embodiment has the capability of being connected directly to a LAN 100 (a facsimile apparatus of this type will be referred to a LAN-FAX hereinafter).

Reference numeral 102 denotes a communication line such as an ISDN (integrated service digital network), a PSTN (public-switched telephone network), etc., that is connected to the LAN-FAX 101.

Figure 2:
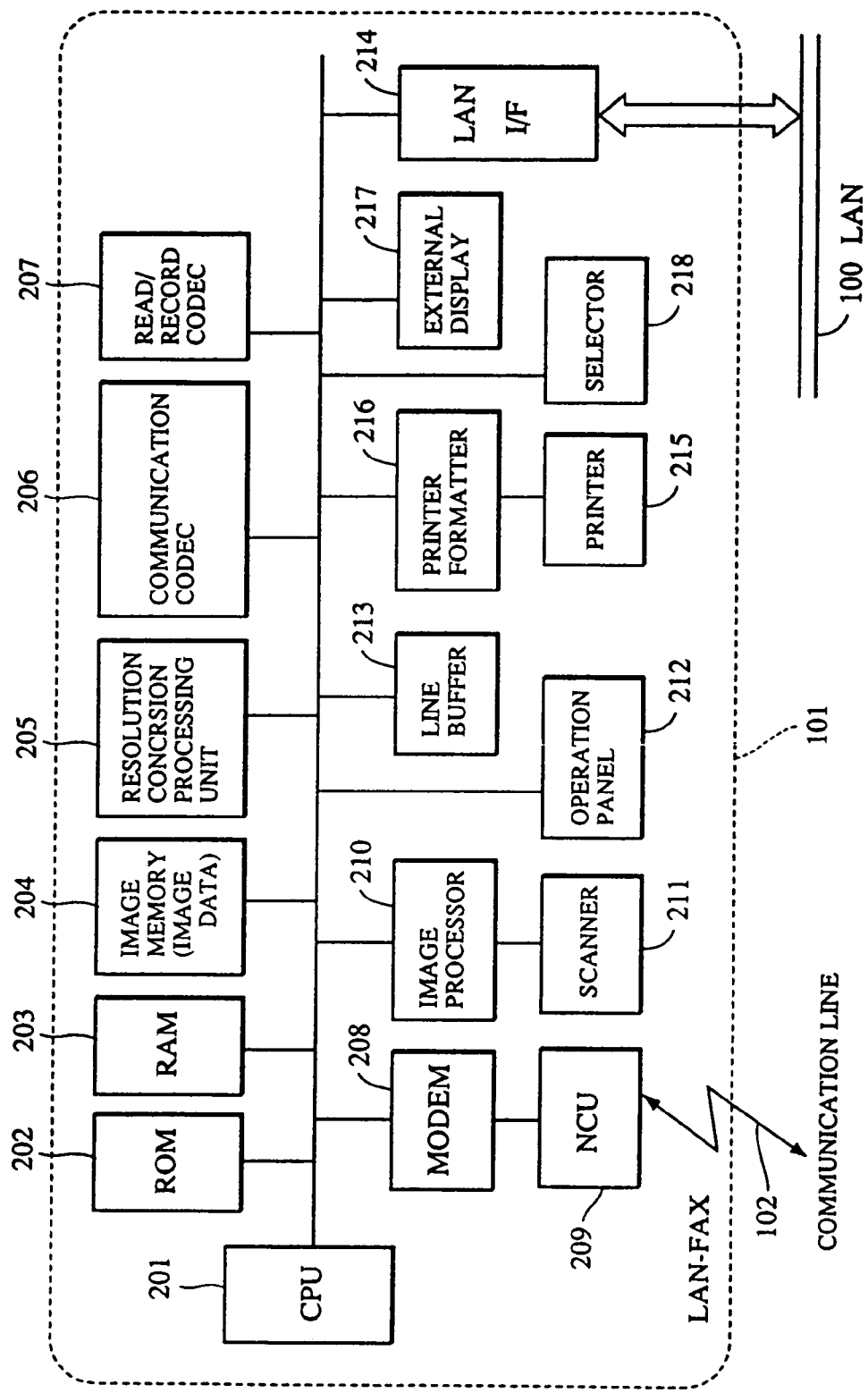
FIG. 2 is a block diagram illustrating a configuration of a facsimile apparatus according to an embodiment of the present invention wherein only major elements are shown.

Reference numeral 103 denotes a server machine or a computer for controlling the LAN 100, wherein the server machine 103 acts as a file server for managing files on the LAN 100. Reference numerals 104 denote client machines (information processing terminals) connected to the LAN 100. Reference numeral 105 denotes a printer server that accepts print requests from client machines 104 and outputs print data to printers 106. Each printing apparatus 106 connected to the printer server 105 outputs print image data in a visual form. If an address is designated, a corresponding printing apparatus is selected from the plurality of printing apparatuses 106 connected to the printer server 105, and thus it is possible to perform a printing operation using a desired printing apparatus. FIG. 2 is a block diagram illustrating the configuration of the LAN-FAX 101 according to the present embodiment, wherein only major elements are shown. The LAN-FAX 101 performs various processing associated with facsimile communication using a CPU 201 and its peripheral elements. The CPU 201 is connected to ROM 202, RAM 203, image data memory 204, a resolution conversion processing unit 205, a communication codec 206, a read/record codec 207, a modem 208, an NCU 209, an image processor 210, a scanner 211, an operation panel 212, a line buffer 213, a LAN interface 214, a printer 215, a printer formatter 216, and an external display 217. The CPU 201 acts as a system controller responsible for the control of the whole of LAN-FAX 101.

Various control programs are preset in the ROM 202 so that the CPU 201 performs various processing described later according to these control programs. The RAM 203 is constructed with for example static RAM (SRAM). The RAM 203 is used as work memory for storing program control variables. The RAM 203 also stores other various data including various setting values registered by an operator via the operation panel 212 and data associated with device management. The image data memory 204 is used to store image data, and comprises recording media such as dynamic RAM (DRAM), a hard disk, floppy disk, etc.

The resolution conversion processing unit 205 performs resolution conversion, for example mm-inch conversion, on raster data. The communication codec (coding and decoding processing unit for communication) 206 performs coding and decoding on image data for communication. The read/record codec (coding and decoding processing unit for read and record operations) 207 performs read/record operations. The modem 208 modulates and demodulates facsimile transmission and reception signals. The NCU 209 performs line control such as automatic calling and answering control in which selection signals (dial pulse or tone dialer) are automatically sent over the communication line 102 and calling tones are automatically detected.

The scanner 211 comprises a CS image sensor, original-document-sheet transfer mechanism, and other elements known to those in the art. The scanner 211 optically reads the information associated with an original document or printed material and converts it into electric image data. The image processor 210 performs various correction processing on the image data read by the scanner 211 and outputs resultant high-quality image data. The operation panel 212 has a keyboard through which an operator inputs various information.

The line buffer 213 stores image data temporarily line by line during transfer of the image data. The LAN interface 214 serves as an interface for the connection to the LAN 100. In this embodiment, the LAN 100 is preferably a network based on a protocol in accordance with the TCP (Transmission Control Protocol)/IP (Internet Protocol). The LAN interface 214 is also based on the protocol in accordance with the TCP/IP.

The printer 215 is a laser beam printer (LBP) for recording the received image data or file data on recording paper. When file data received from a client machine 104 is printed, the printer formatter 216 analyzes the printer description language and converts the file data to image data according to the analysis result.

If an error occurs in the LAN 100, the external display 217 gives a user warning of the error by displaying a warning message or by causing the display to blink.

A selector 218 analyzes a process command received from a client machine 104 connected to the LAN 100, and sets the operation mode of the LAN-FAX 101 to a communication mode, recording mode, or reading mode according to the analysis result.

Figure 3:
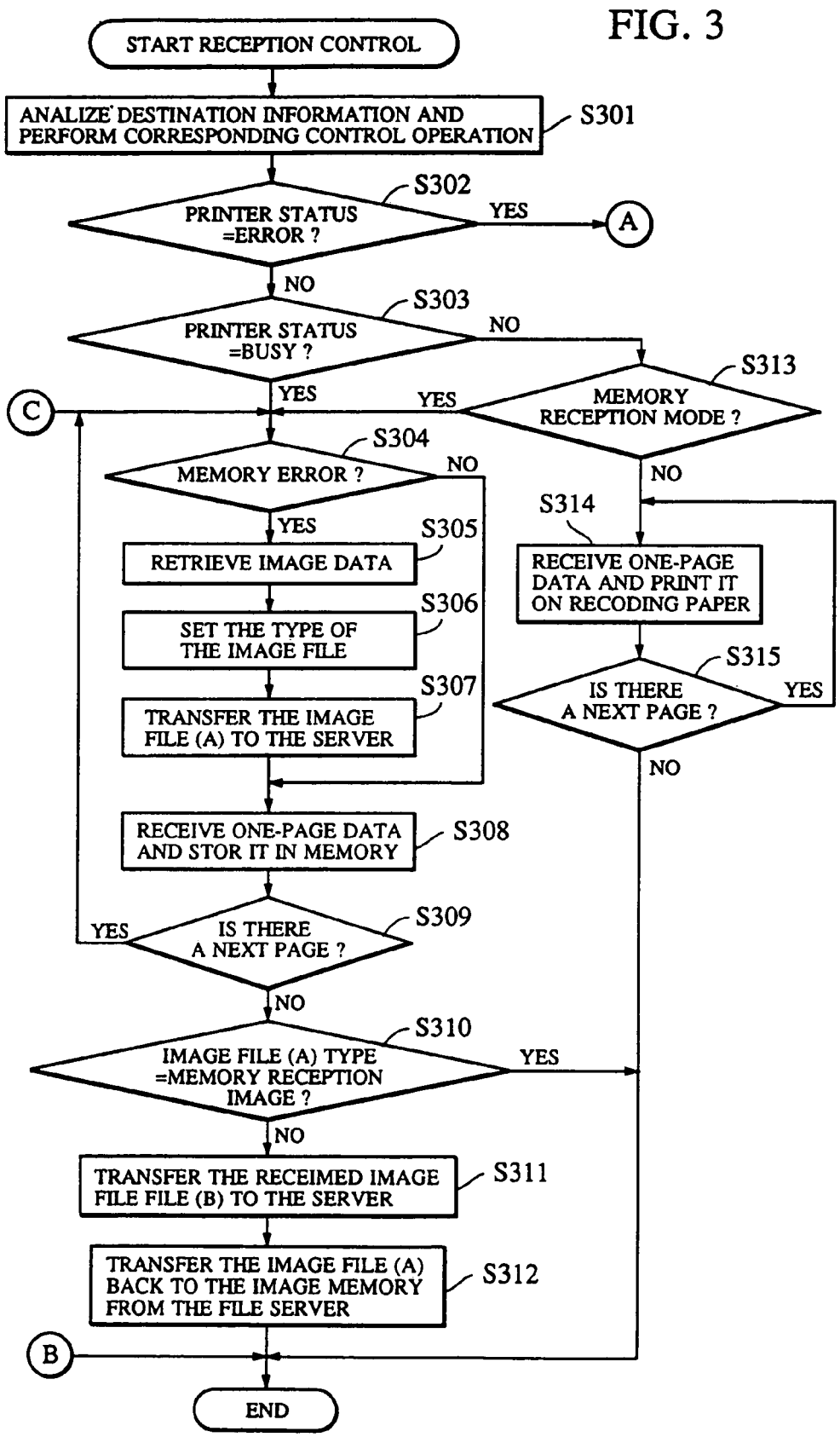
FIGS. 3-5 are flow charts illustrating operation flows of a facsimile apparatus according to an embodiment of the present invention.
Figure 4:
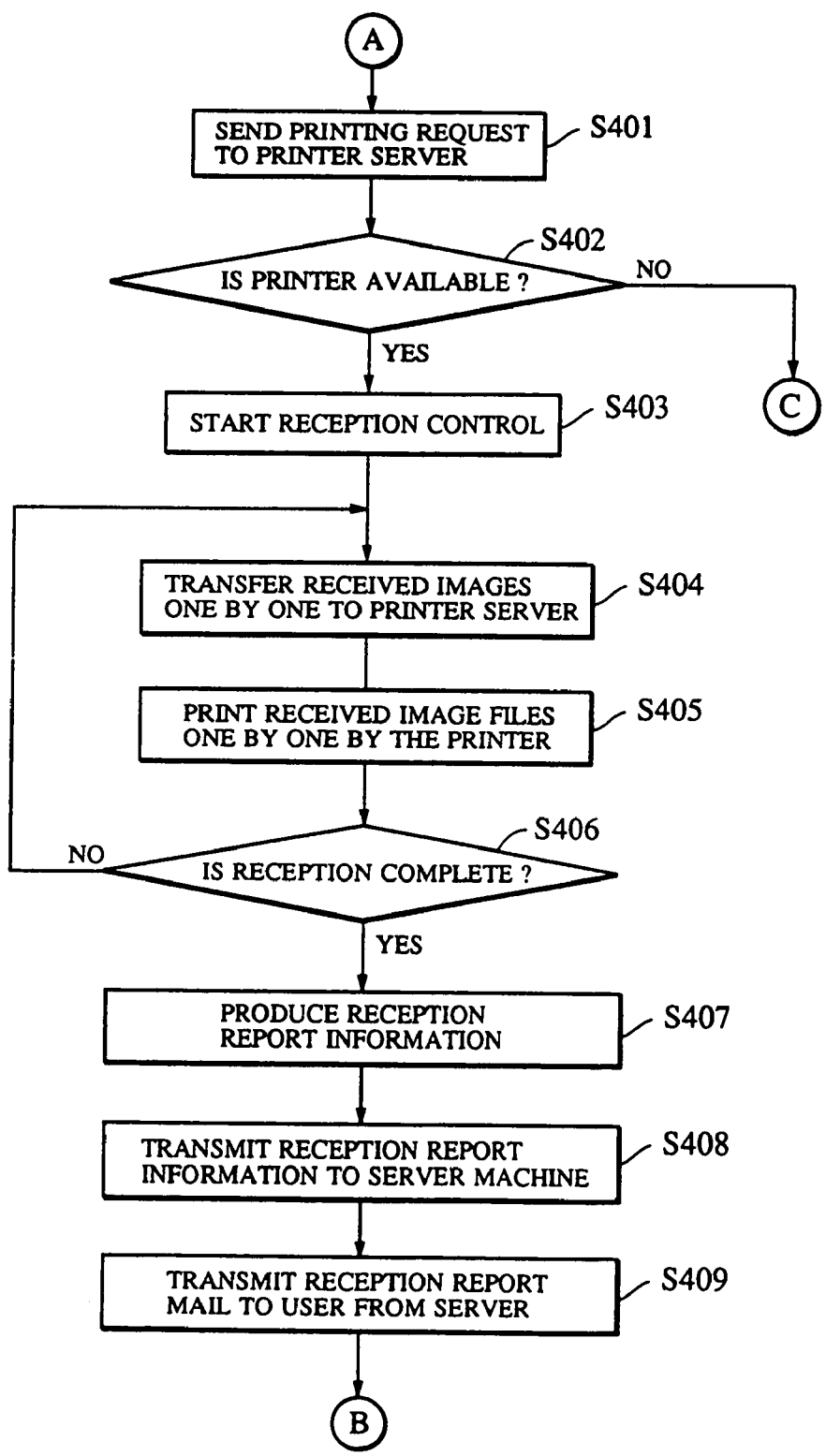

Referring to the flow charts shown in FIGS. 3 and 4, the receiving operation of the LAN-FAX 101 will be described below.

First, sender information, that has been received from a sending station and stored in an NSF (non-standard function) frame, is analyzed and set as a sending user name (step S301). The sender information stored in the NSF frame represents the user name (log-in name) of the destination user and is stored as the destination name in the form of ASCII codes. More specifically, the sender information is stored in the RAM 203.

Then, the status of the printer 215 of the LAN-FAX 101 is analyzed. In this embodiment, the possible statuses of the printer 215 include NORMAL status, in which the printer 215 is available, BUSY status, in which the printer 215 is being used in another task, and ERROR status, which means that an error has occurred in the printer 215.

Then, it is determined whether the status of the printer 215 is ERROR status or not (step S302). If the status is not ERROR status, then whether it is BUSY is determined (step S303). If the status is BUSY, then the status of the image data memory 204 in the LAN-FAX 101 is checked (step S304) so as to determine whether an error has occurred in the image data memory 204 judging from the remaining room in the image data memory 204 or from other parameters.

If no errors occur in the image data memory 204, then the process skips the steps associated with the transferring of image data stored in the image data memory 204, and proceeds to step S308, in which image data is received and stored in the image data memory 204, that is, a memory receiving operation is performed. On the other hand, if there is an error in the image data memory 204, then the image data stored in the image data memory 204 is transferred. In this transferring operation, an image data file stored in the image data memory 204 is retrieved first (step S305). The types of image data files stored in the image data memory 204 include a memory-reception image data file, a memory-transmission image data file, a timer-transmission image data file, a print image data file, and a polling-transmission image data file. These image data files are accessed depending on the following causes or factors.

(1) A memory-reception image data file is accessed by a user and printed out.

(2) A memory-transmission image data file is automatically transmitted as soon as the communication line becomes available.

(3) A timer-transmission image data file is automatically transmitted at a time set in the timer.

(4) A print image data file is printed as soon as the printer 215 becomes available.

(5) A polling-transmission image data file is transmitted in response to a call-in from a polling receiving station.

In this embodiment, the transmission priorities are defined according to the types of image data files to improve the throughput of the apparatus. For example, a memory-reception image data file is a file that is to be processed in response to user's access, and therefore this type of file has a high transfer priority. A polling transmission image data file is a file that is accessed from the outside via the communication line 102, and therefore its transfer priority is set to a low level. More specifically, the priorities are set in the order of memory-reception image data files>timer-transmission image data files>memory-transmission image data files>print image data file>polling transmission image data file. In other words, files having a greater necessity of remaining in the LAN-FAX 101 remain in the image data memory 204 of the LAN-FAX 101.

In step S305, therefore, image data files are retrieved according to the above transfer priority order. Thus, the file type of an image data file to be transmitted is set (step S306), and the image data file is then transferred to the server machine 103 (step S307).

Figure 24:
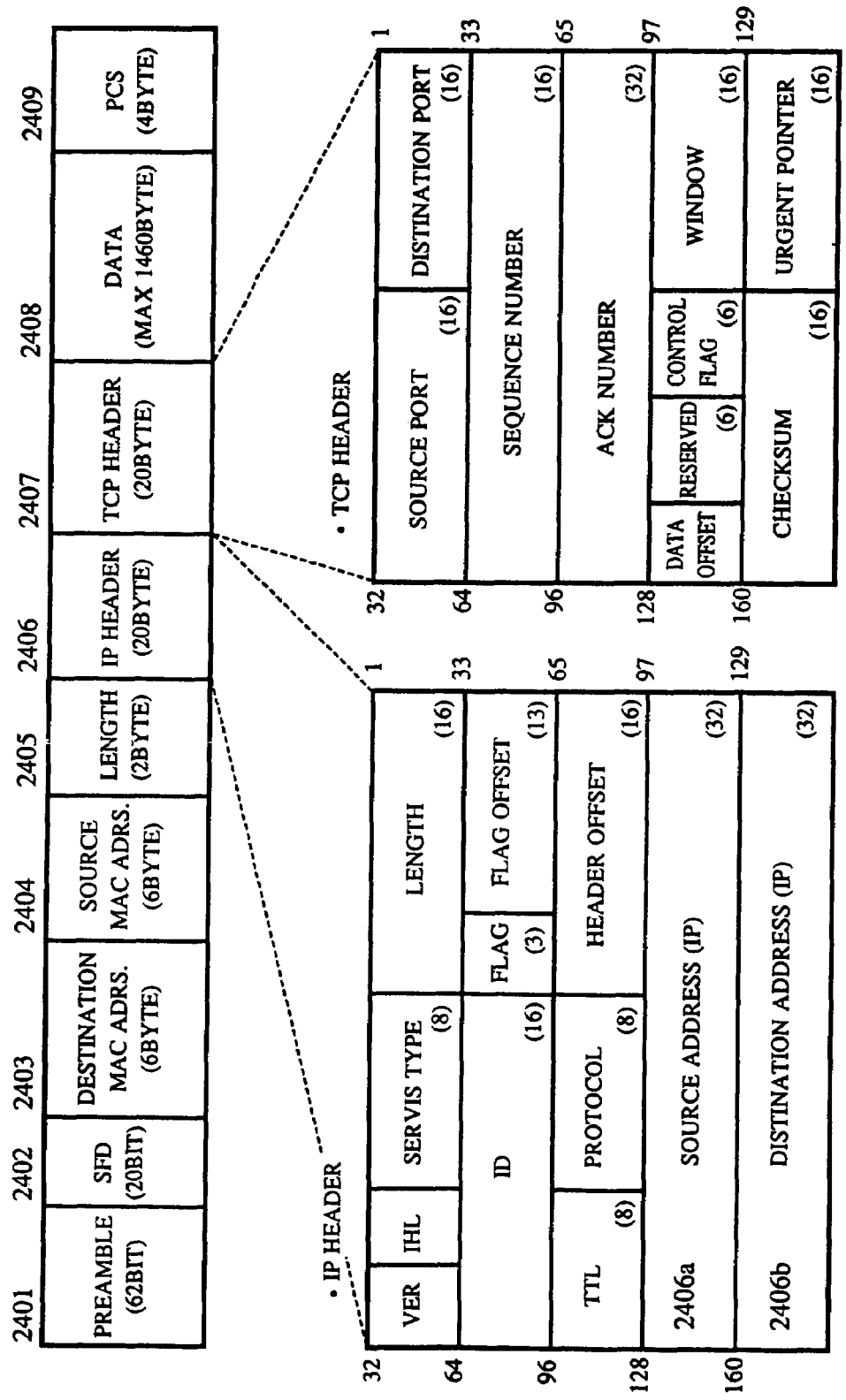
FIG. 24 is a schematic diagram illustrating the organization of IP addresses used in a TCP/IP protocol.

The transfer of an image data file to the server machine 103 will be described further. First, a transfer image data file is produced on the basis of the address of the server machine 103 associated with the LAN 100. This transfer image data file is produced in accordance with the protocol of the LAN 100 through which the file is to be transferred. In this embodiment, since the protocol of the LAN 100 is defined according to TCP/IP protocol, the transfer image data file is constructed according to the TCP/IP protocol. That is, as shown in FIG. 24, the transfer image data file is composed of an MAC (Media Access Control) address, an IP header, a TCP header, data, and other fields. In FIG. 24, reference numeral 2403 denotes the destination's MAC address (6 bytes), representing the destination to which data is to be sent. Reference numeral 2404 denotes the source's MAC address (6 bytes), representing the source from which the data is sent. MAC addresses are uniquely assigned to individual devices connected to the LAN. These MAC addresses correspond to a data link layer of the OSI layer 7. Reference numeral 2406 denotes an IP header corresponding to the protocol of the network layer in the OSI layer 7. In this IP header, addresses required for accessing a device connected to the network are defined. That is, the IP header includes an IP address 2406a of a source and an IP address 2406b of a destination. Reference numeral 2407 denotes a TCP header corresponding to a transport layer in which prescription is given for ensuring high reliability in the data transfer. Reference numeral 2408 denotes a data field corresponding to an application layer of the OSI layer 7.

In this LAN-FAX 101, when the data destination designated by the MAC address 2403 is an apparatus connected to the LAN, the data is automatically transferred to that apparatus designated by the address.

As described above, a transfer image data file is organized according to the TCP/IP protocol, and thus includes MAC addresses, an IP header, a TCP header, a data field, and other fields. In this embodiment, when image data to be transferred is stored in memory of the server machine 103, it is required to identify its file type and file number. For this purpose, the above-described data field includes a command data file containing file information associated with the above items as well as an image data file containing image data. A data file transfer operation is controlled by transmitting both these files. Of two types of files, the command data file is analyzed by application software for file type analysis stored in the server machine 103 whereby the server machine 103 manages the file type of a transfer image data file.

When the transfer image data file has been transferred to the server machine 103 in step S307, the available area of the image data memory 204 becomes greater than a required value. Thus, a receiving operation to receive the image data starts, and one page of reception image data is stored in the image data memory 204 (step S308). Then, it is determined whether there is a next page in the reception image data (step S309). If there is a next page in the reception image data, then the process returns to step S304, in which the memory receiving operation is continued.

On the other hand, if there is no further page in the reception image data, then it is determined whether the type of the image data file that was transferred in step S307 is a highest-transfer-priority memory-reception image data file (step S310). If the transferred image data file is not of that type, the image data file that was transferred to the server machine 103 and saved there temporarily has a higher transfer priority than the image data (received image data file) that has been stored in the image data memory 204 at this time in step S308. Therefore, the received image data file that has been stored at this time in the image data memory 204 is replaced with the image data file that was saved temporarily in the server machine 103.

That is, at the first step of the file replacement, the received image data file that has been stored in the image data memory 204 is transferred to the server machine 103 (step S311). Of the image data files (transfer image data files) saved temporarily in the server machine 103, that image data file having the lowest transfer priority is transferred back to the image data memory 204 first, then the image data file having the next lowest transfer priority is transferred back next, and so on (step S312).

The above transferring-back operation is performed by sending a transferring-back request and the information on the remaining available area of the image data memory 204 to the server machine 103 according to the TCP/IP protocol. The server machine 103 analyzes the types of the received transfer image data files under the control of the above-described application software for file type analysis, and transfers these files in turn in the order opposite to the transfer priority, taking into account the information on the remaining available memory area received from the LAN-FAX 101. In the above operation, if a user of the LAN-FAX 101 issues a request for printing a received image data file stored in the server machine 103, the LAN-FAX 101 automatically sends a transferring-back request to the server machine 103 so as to print the requested file.

If the decision result in step S303 has shown that the printer 215 is not in BUSY status, that is, if it is in NORMAL status, then it is determined whether the printer 215 is in the memory receiving mode or not (step S313). If the printer 215 is in the memory receiving mode, then the process proceeds to step S304 to perform the memory receiving operation.

On the other hand, if the printer 215 is not in the memory receiving mode, that is, if it is in the recording-on-recording-paper receiving mode, then one page of data is received and recorded on recording paper (step S314). Then, whether there is a next page in the receiving image data is determined (step S315). If there is a next page in the receiving image data, then the process returns to step S314 and continues the recording-on-recording-paper receiving operation. If there is no further page in the receiving image data, the operation is complete.

In step S302, if it has been judged that the printer 215 is in the ERROR status, then the data is transferred to the printing apparatus 106 connected to the LAN 100, thereby outputting the data. First, in this case, a print request is sent to the printer server 105 that controls the spooling operation on the LAN 100 associated with print image (step S401). Then, the status information of the printing apparatus 106 sent back in response to the above print request is analyzed so as to determine whether the printing apparatus 106 is available or not (step S402). If the printing apparatus 106 is not available, the process proceeds to the above-described step S304.

If the printing apparatus 106 is available, then an image data receiving operation starts (step S403), and the received image data is transferred in turn to the printer server 105 (step S404). In the above transferring operation, the image data is configured according to the TCP/IP protocol in which the image data is divided into several portions each including a predetermined amount of image data, and then each portion is transferred in turn. The printer server 105 stores the received image data. When the amount of the received image data has reached one page, the printer server 105 transfers the received image data to a printing apparatus 106, which in turn prints the received image data (step S405). Then, whether the image data receiving operation is complete or not is determined (step S406). If the operation is not complete yet, then the process returns to step S404 to continue the transferring and printing operation. The process during steps S402 through S405 is performed using application software for remote printing that has been installed beforehand in the printer server 105.

After the completion of the receiving operation, the server machine 103 sends a reception-report mail to the user who sent the data so as to report that the received image data file has been printed by means of remote printing on a printing apparatus 106 connected to the LAN 100.

That is, in step S407, the LAN-FAX 101 produces reception-report information based on the sender information obtained in step S301, and sends it to the server machine 103 (step S408). Then, the server machine 103 produces a reception-report mail based on the reception-report information received from the LAN-FAX 101, and sends the reception-report mail to the corresponding user (step S409), and then the process is complete.

In the above-described operation, the server machine 103 produces the reception-report mail under the control of application software for reception-report mail production that has been installed beforehand in the server machine 103. The destination of the reception-report mail is set by retrieving the address corresponding to the sender information, or the user name information from a log-in user address map that is managed by the server machine 103.

When the remote printing is performed, the address of the printing apparatus 106 is stored in the RAM 203 so that the address may be output later for confirmation.

The printing apparatus 106 itself also outputs a report telling that the remote printing has been performed.

In the first embodiment, as described above, if the remaining available area of the image data memory 204 for storing reception image data is insufficient, image data stored in the image data memory 204 is transferred to the server machine 103 so that the available area of the image data memory 204 becomes sufficient to perform a receiving operation.

Furthermore, priorities are defined for files to be transferred to the server machine 103 so that files having a greater necessity of remaining in the LAN-FAX 101 can remain in the LAN-FAX 101, whereby high-efficiency processing can be achieved.

If an error occurs in the printer 215 and thus the printer 215 cannot print data, the print data is transferred to a printer server 105 and printed by the printing apparatus 106. Furthermore, the address of the printing apparatus 106 that has printed the data is stored so that it is possible to know which printing apparatus 106 has printed the data. In the above processing, the LAN-FAX 101 produces reception-report information based on the address information and sends it to the server machine 103. The server machine 103 sends a reception-report mail to a sending user to tell that the received data has been remote-printed using a printing apparatus 106 so that the operator who sent the data to the LAN-FAX 101 can easily know the result.

Second Embodiment

In the above first embodiment, if an error is detected in the LAN-FAX 101 during a receiving operation, image data is transferred to the server machine 103. Alternatively, when the LAN-FAX 101 receives a request to print a file such as a document file produced by a client machine (information processing terminal) 104 connected to the LAN 100, if an error is detected in the LAN-FAX 101, then the file such as a document file to be printed (hereafter refer to as a print file) may be transferred to the printer server 105.

The printing operation by the LAN-FAX 101 will be described referring to the flow chart shown in FIG. 5. In this embodiment, the print file is described using a page description language and is printed with fonts developed by the printer formatter 216.

First, the LAN-FAX 101 accepts a print request from a client machine 104 (step S501). Then, the LAN-FAX 101 analyzes which client machine 104 has issued the print request, and obtains and sets address information such as the IP address of the client machine 104 with respect to the LAN 100 (step S502).

The print file is received via the LAN interface 214 and stored in image data memory 204 of the LAN-FAX 101 (step S503). In the above operation, the transmission and reception of the print file are performed according to the TCP/IP protocol.

The operation status of a printer installed in the LAN-FAX 101 (hereafter referred to as a LAN-FAX printer) 215 is then checked, that is, whether it is available or not is determined (step S504). If it is available, then the LAN-FAX printer 215 starts a printing operation to print the print file (step S511). Once the printing operation is complete (step S512), the process is complete.

On the other hand, if the LAN-FAX printer 215 is not available, the operation status of a printing apparatus 106 connected to the LAN 100 is checked to determined whether it is available or not (step S505). The availability of the printing apparatus 106 is determined from the status of the printer server 105 connected to the LAN 100, wherein the status is reported back in response to a printer status request sent to the printer server 105.

If the printing apparatus 106 is not available, then the process returns to step S504, in which the availability of the LAN-FAX printer 215 is checked again. On the other hand, if the printing apparatus 106 is available, then the print file is transferred to the printer server 105 (step S506), and printed (remote-printed) by the printing apparatus 106 (step S507). Then, whether the remote printing is complete or not is determined (step S508). If the remote printing is not complete, then the process returns to step S506 to continue the remote printing operation.

In the above operation, the print file is configured according to the TCP/IP protocol in which the image data is divided into several portions each including a predetermined amount of image data, and then each portion is transferred in turn. The printer server 105 stores the received print file (image data). When the amount of the received image data has reached one page, the printer server 105 transfers the received image data to a printing apparatus 106, which in turn prints the received image data. The process during steps S506 through S508 is performed using application software for remote printing that has been installed beforehand in the printer server 105.

Then, the server machine 103 sends a report mail to the user (terminal) who sent the data so as to report that the print file has been printed by means of remote printing with a printing apparatus 106 connected to the LAN 100. That is, in step S509, the LAN-FAX 101 produces a remote print report mail based on the user address information set in step S502, and sends it to the information processing terminal at the above user address (step S510), and then the process is complete.

In the second embodiment of the present invention, as described above, when the LAN-FAX 10 receives a print request from a client machine 104, if the printer 215 is incapable of printing it due to an error, then printing is performed using a printing apparatus 106. The server machine 103 sends a report mail to a user who issued the print request to tell that the received data has been remote-printed so that the user can easily know the status from the report mail.

In the first embodiment described earlier, the destination of received image data is designated by destination user name information stored in the NSF frame. However, the present invention is not limited to this. Alternatively, for example, a password may be stored in a password (PWD) frame according to the prescription of the ITU-T standard, and the LAN-FAX 101 may convert the password to user name information. In this case, the LAN-FAX 101 has a password table in which user name information corresponding to passwords is registered, and the LAN-FAX 101 converts a password to user name information by retrieving the password table.

In the first embodiment, when an error is detected in the LAN-FAX 101, an image data file is transferred to the server machine 103. However, the apparatus to which the data file is transferred is not limited to the server machine 103. For example, the data file may also be transferred to memory of another LAN-FAX or peripheral apparatus connected to the LAN. Furthermore, not only when the printer is in ERROR status, but also when the printer is in BUSY status, an image data file may be transferred to a printing apparatus 106 or another LAN-FAX 101 so as to print the image data file.

In the first and second embodiments, the protocol associated with the LAN is in accordance with the TCP/IP. However, the present invention is not limited to this. For example, the protocol according to the SPX/IPX or the like may also be employed.

In the first embodiment, when an error is detected in the LAN-FAX 101, an image data file is transferred according to the transfer priority that has been defined beforehand in connection with the file type (attribute). However, the present invention is not limited to this. For example, the transfer priority may also be defined in connection with the size of an image data file or the storage time at which an image data file was stored in the image data memory. Alternatively, a user may define the transfer priority in an arbitrary way without fixing the transfer priority.

In the first and second embodiments, when an error is detected in the printer 215 of the LAN-FAX 101, data is transferred to the printer server 105 so as to print the data using a printing apparatus 106. In addition to the above operation mode, which may be referred to as a first mode, there may be a second operation mode in which printing is performed when the printer 215 has recovered from the error and has become capable of printing. Both modes may be registered beforehand in the LAN-FAX 101.

Furthermore, in the first and second embodiments, the apparatus to which image data is to be transferred is not limited to only one apparatus. Instead, the image data may be transferred to a plurality of apparatuses. In this case, apparatuses are checked to determine if they are available or not, and image data is transferred to the available apparatuses, wherein information about the transfer destinations are memorized for each page.

Third Embodiment

In the first embodiment described earlier, if the available space of the image data memory 204 of the LAN-FAX 101 has become insufficient, image data stored in the image data memory 204 is transferred to a server machine 103 so that the available space of the image data memory 204 becomes sufficient to continue the process. In contrast, in a third embodiment described hereinbelow, image data stored in the image data memory 204 remains there, and any further image data that is received is transferred to another apparatus connected to the LAN. With this arrangement, the communication time can be shorten compared to that required in the first embodiment. In this third embodiment, a method of managing image data as well as a memory managing method will also be described in detail.

Figure 6:
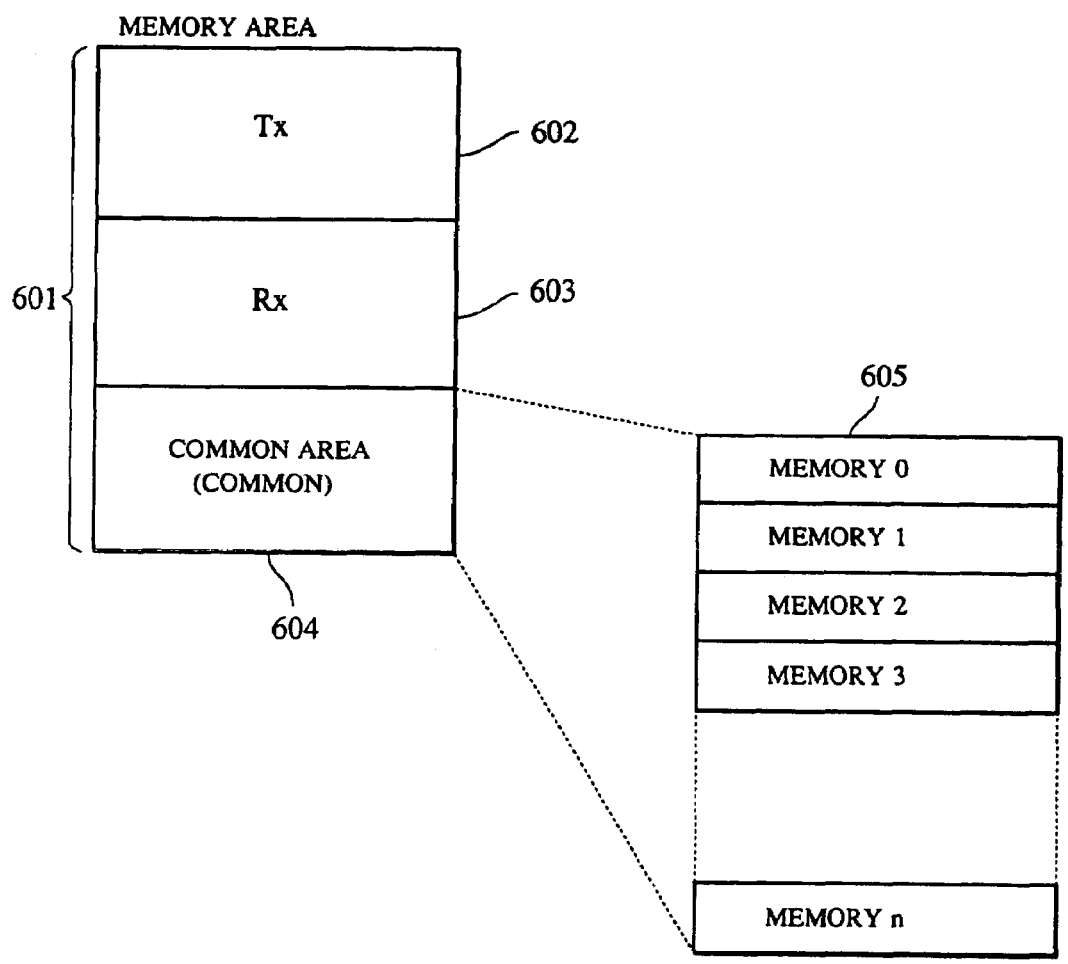
FIG. 6 is a schematic diagram illustrating a memory area configuration for explanation of a memory managing method in a facsimile apparatus according to an embodiment of the present invention.

FIG. 6 is a schematic diagram illustrating a memory area configuration for explanation of the method of managing image data memory 204 of the LAN-FAX 101 according to the present embodiment. In FIG. 6, reference numeral 601 denotes the entire memory area to be managed. In the LAN-FAX 101 of the present embodiment, the entire memory area 601 is divided into three areas: a transmission memory area (602); a reception memory area (603); and a common memory area (604) for use in both transmitting and receiving operations. As denoted by reference numeral 605, each memory area is further divided into n memory areas for management.

Figure 16:
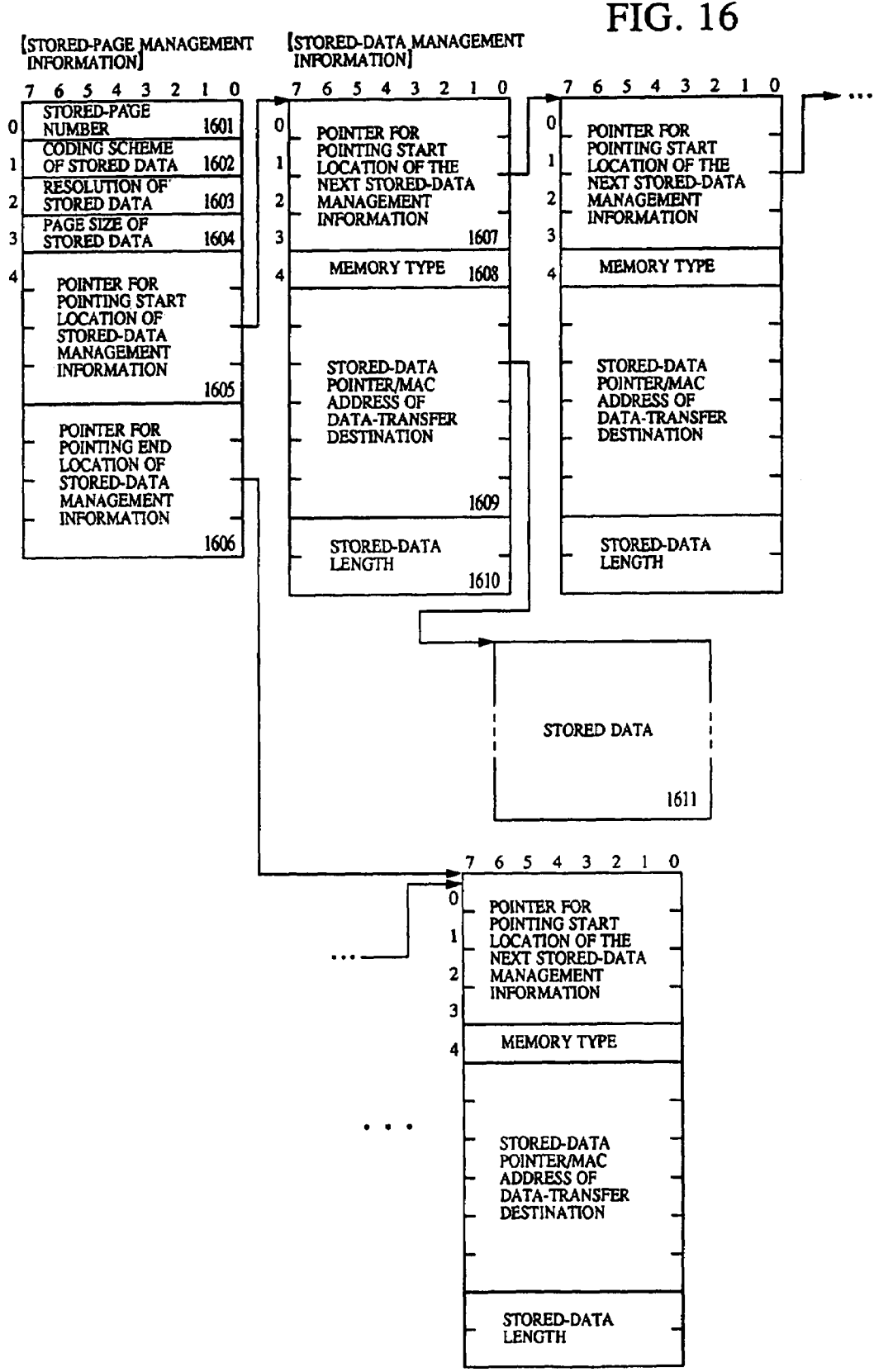
FIG. 16 is a schematic diagram illustrating stored-page management information managed in a facsimile apparatus according to an embodiment of the present invention.

FIG. 16 schematically illustrates stored-page management information according to the present embodiment. The stored-page management information and stored-data management information shown in FIG. 16 are stored in assigned areas of RAM 203.

The contents of the stored-page management information can be printed out or displayed on a display device by issuing an instruction via the operation panel 212. The stored-page number 1601 stores the page number of stored data. The coding scheme of stored data 1602 stores the coding scheme of the stored data. The resolution of stored data 1603 stores the resolution of the stored data. The page size of stored data 1604 stores the page size of the stored data. The stored-data start location pointer 1605 is a pointer for pointing the start location of a memory area in which the stored-data management information is actually stored. The stored-data end location pointer 1606 is a pointer for pointing the end location of a memory area in which the stored-data management information is actually stored. The next-stored-data pointer 1607 is a pointer for pointing the location of a memory area in which other stored-data management information is actually stored wherein the memory area is linked to the previous memory area. The memory type 1608 stores information representing whether the stored data resides in the internal memory of the LAN-FAX 101 or in memory of another terminal connected to the LAN. The stored-data-pointer/MAC-address-of-data-transfer-destination 1609 stores a pointer for pointing the stored data when the information stored in the memory type 1608 indicates that the data is stored inside the LAN-FAX 101, or stores an MAC address of a terminal connected to the LAN when the information stored in the memory type 1608 indicates that the data is stored in the terminal connected to the LAN. The stored data length 1619 stores the length of the stored data 1611, wherein the stored data 1611 is actual image data.

Figure 17:
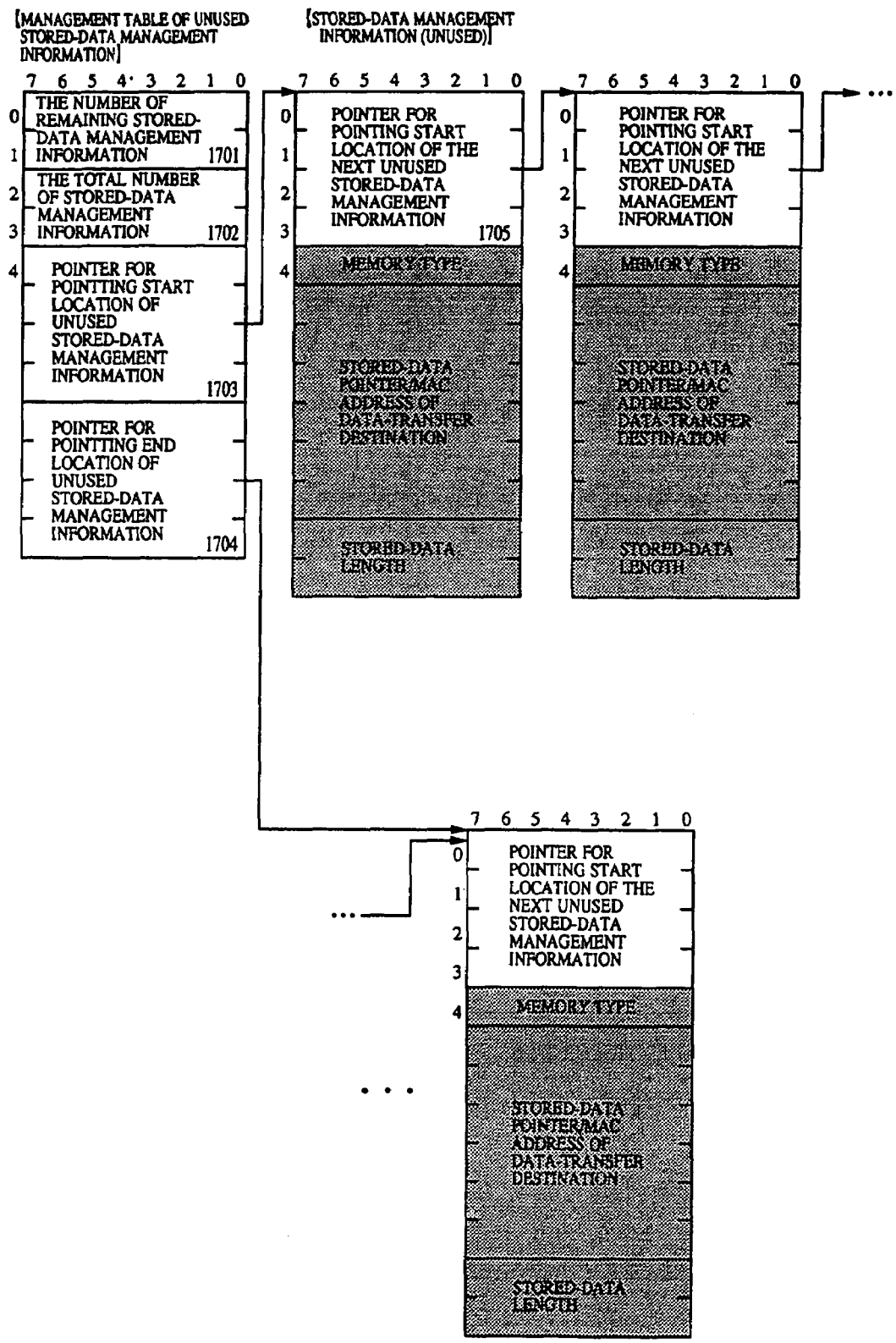
FIG. 17 is a schematic diagram illustrating a table used for managing stored-page management information remaining unused in a facsimile apparatus according to an embodiment of the present invention.

FIG. 17 schematically illustrates a table used to manage unused stored-data management information according to the present embodiment of the invention.

In this figure, the number 1701 of remaining stored-data management information stores the number of units of stored-data management information remaining unused. The total number 1702 of units of stored-data management information stores the total number of the stored-data management information units. The unused stored-data management-information start pointer 1703 points the location of the first stored-data management-information remaining unused. The unused stored-data management-information end pointer 1704 points the location of the last stored-data management-information remaining unused. The next unused stored-data management-information pointer 1705 points the location of the next stored-data management-information remaining unused.

Now, the control procedure of the LAN-FAX 101 according to the present embodiment of the invention will be described.

FIGS. 7-15 are flow charts illustrating the control procedure of the LAN-FAX 101 according to the present embodiment of the invention.

Referring to FIGS. 7-15, the control procedure during a memory reception operation will be described below.

Figure 7:
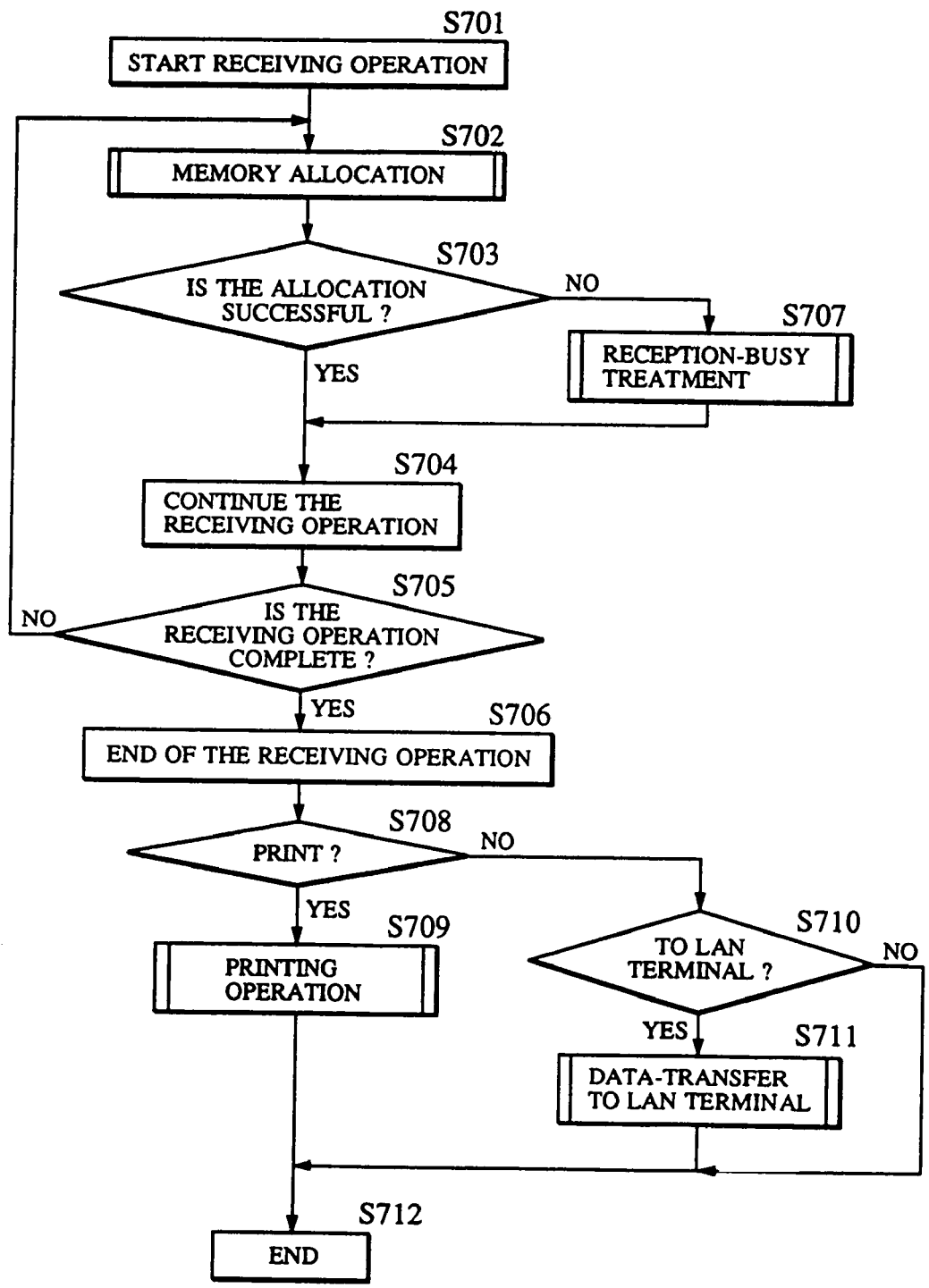
FIGS. 7-15 are flow charts illustrating operation flows of a facsimile apparatus according to an embodiment of the present invention.

When a receiving operation starts in an image processing apparatus according to the present embodiment of the invention, memory allocation is performed first (step S702 in the flow chart of FIG. 7). A more detailed flow chart associated with this reception memory allocation is shown in FIG. 10.

First, the stored-data management information is acquired via the unused stored-data management-information start pointer 1703 so as to determine whether there is available room in the image data memory 204 of the LAN-FAX 101 itself.

Figure 10:
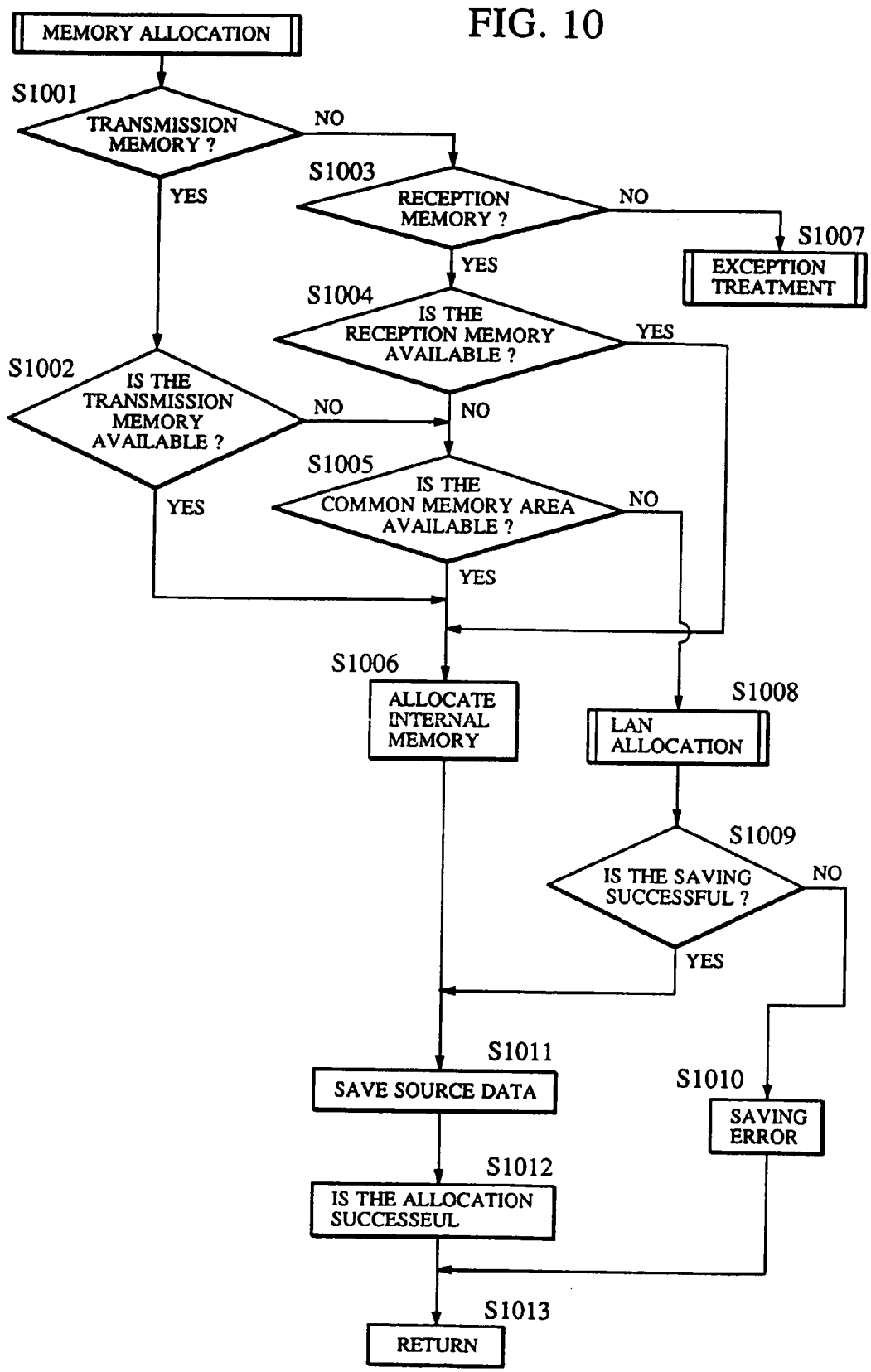

The decision result of step S1001 in FIG. 10 is negative in this case since the operation is in the receiving operation mode. Therefore, the process proceeds to step S1003, in which a positive decision result is obtained and thus the process further proceeds to step S1004. In this step S1004, whether there is available room in the reception memory 603 is examined. If there is available memory room in it, then memory allocation is performed on the reception memory 603 (step S1006).

If it has been concluded in step S1004 that there is no available room in the reception memory 603, then it is examined whether there is available room in the common memory 604 (step S1005). If there is available room there, the common memory 604 is allocated (step S1006).

Figure 11:
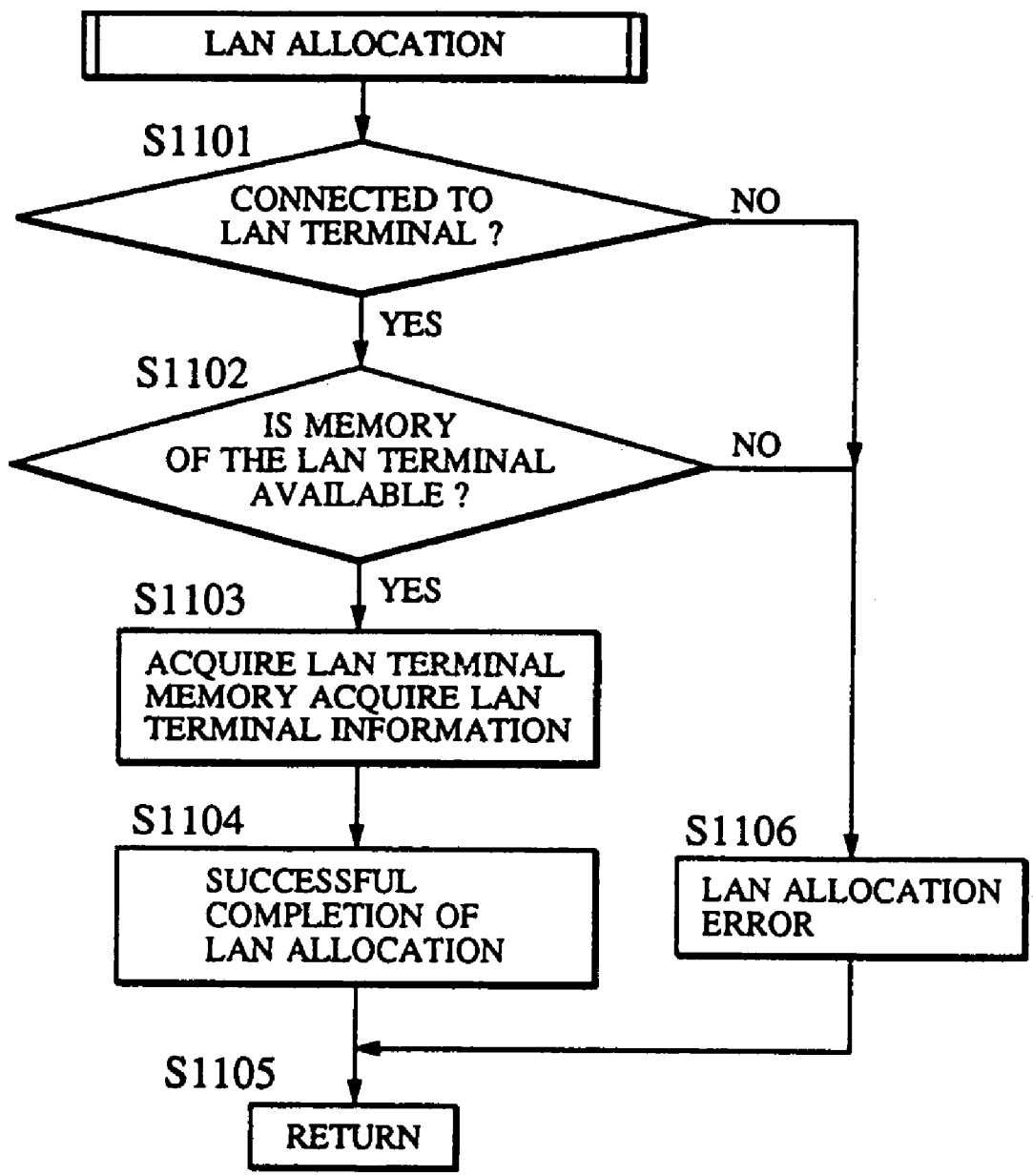

If the common memory 604 also has no available room, that is, if there is no available room anywhere in the image data memory 204 of the LAN-FAX 101, then the process proceeds to step S1008, in which memory in a terminal connected to the LAN is allocated (refer to FIG. 11).

If it has been concluded either in step S1003 or in step S1005 that there is available room, then after step S1006 in which the available storage memory is allocated, the information indicating that the image data memory 204 of the LAN-FAX 101 itself is allocated as the reception memory is stored in the memory type 1608 (step S101). Thus, the memory allocation procedure is successfully completed (S1012) and returns to the main procedure (S1013).

Referring to FIG. 11, the procedure (S1008) associated with the memory allocation to a terminal connected to the LAN will be described in greater detail.

In step S1101, it is determined whether the LAN-FAX 101 is connected to the LAN via the LAN I/F 214 of the LAN-FAX 101 itself, or not.

If it has been concluded in step S1101 that the LAN-FAX 101 is connected to the LAN, then inquiry is made as to where the image data is to be saved, and as to whether there is available room in the memory of the terminal to be allocated, so as to determine whether it is possible or not to use the memory in the terminal connected to the LAN (S1102).

If it has been concluded in step S1102 that there is available memory area, then the memory in the LAN terminal is allocated instead of the image data memory 204. The MAC address of the LAN terminal the memory of which has been acquired is stored in the MAC address 1609 (step S1103). Thus, it has been concluded (step S1104) that it is possible to save the data to the memory in the LAN terminal, and the procedure associated with the memory allocation to the LAN terminal returns to the main procedure (S1105). In the case where the LAN terminal memory is available for saving the data, the receiving operation is continued in step S704, and the data received hereafter is saved in the allocated memory.

Now, the data flow that occurs when memory of a LAN terminal is allocated will be described.

First, based on the LAN address of the file server, a transfer image data file is produced. This transfer image data file is configured according to the protocol of the LAN to which the LAN-FAX 101 is connected. More specifically, in this embodiment, the transfer image data file is configured according to the TCP/IP protocol.

The data configuration according to the TCP/IP protocol has been described already, and therefore it will not be described here again.

If it has been concluded in step S1101 that the LAN-FAX 101 is not connected to the LAN, or if it has been concluded in step S1102 that it is impossible to acquire the LAN terminal memory, then an emergency buffer (not shown) for busy-reception action is allocated. In this case, it is concluded that it is impossible to save the data in the LAN terminal memory (step S1106), and thus the LAN terminal memory allocation procedure returns to the main procedure with the result indicating an memory allocation error.

In step S1009, it is determined whether the LAN terminal memory acquisition is successful or not. If it has been concluded in step S1009 that the LAN terminal memory has been acquired, then the memory in the LAN terminal is allocated, and information indicating that the LAN terminal memory has been allocated as the reception memory is stored in the memory type 1608 (S1011). Then, the memory allocation procedure returns to the main procedure (S1013). On the other hand, if it has been concluded in step S1009 that the LAN terminal memory has not been acquired, the memory allocation procedure returns to the main procedure with the result indicating a memory allocation error (S1010, S1013).

Figure 8:
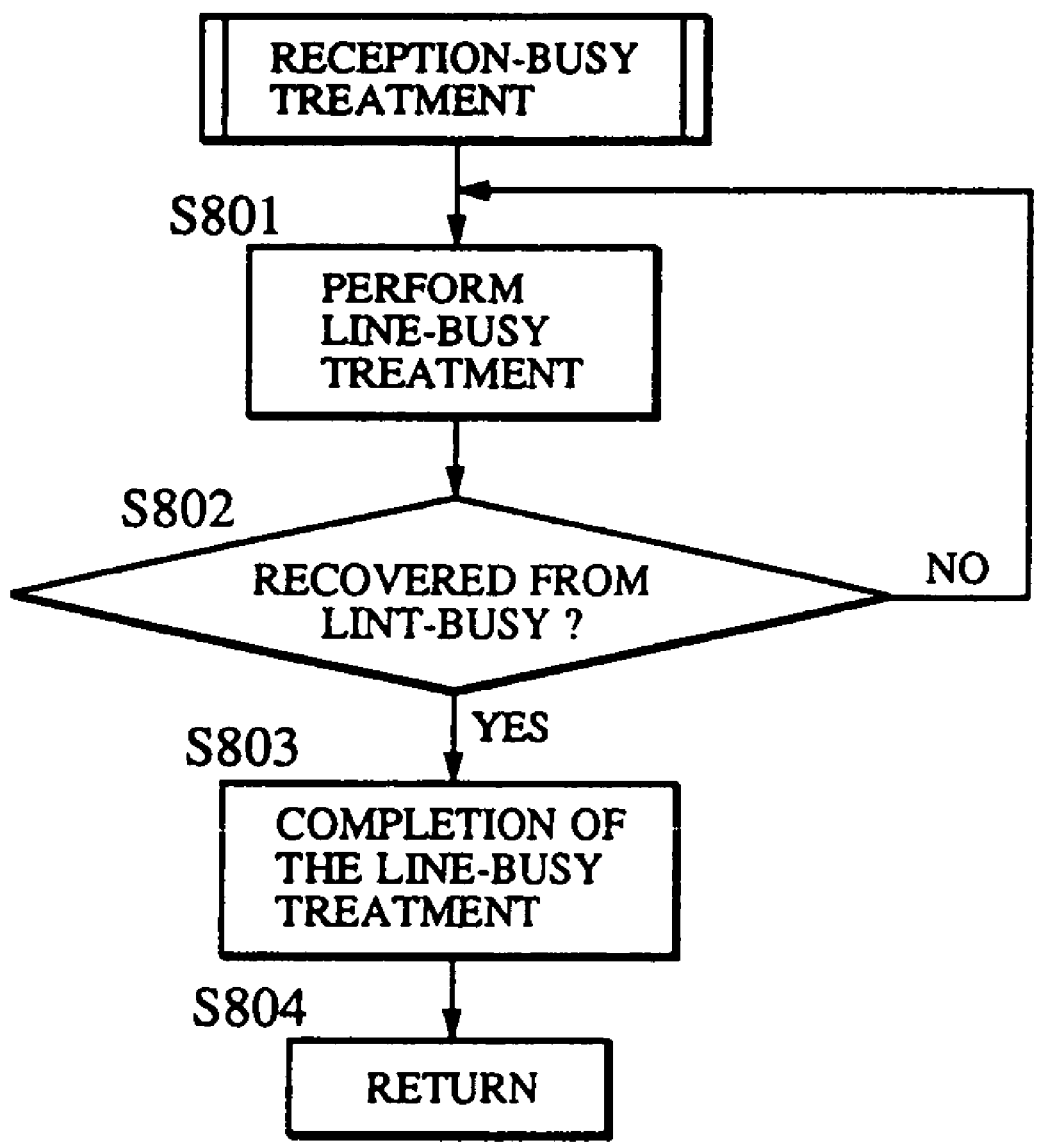

In the case where the memory allocation in step S702 is unsuccessful, busy-reception action is performed (S707 in FIG. 8).

Referring to FIG. 8, the busy-reception action S707 will be described in greater detail.

First, busy-communication-line action is performed, that is, information indicating that the LAN-FAX 101 is in a busy-reception status is sent to the terminal with which the LAN-FAX 101 is communicating (S801).

In step S802, it is determined whether the LAN-FAX 101 has recovered from the busy status. If the LAN-FAX 101 has not recovered yet from the busy status, then the process continues step S801. If the LAN-FAX 101 has recovered from the busy status, then information indicating that the the LAN-FAX 101 has recovered from the busy status is sent to the terminal with which the LAN-FAX 101 is communicating (S803), and then the receiving operation is continued (S704).

On the other hand, in the case where the memory allocation in step S702 is successful, then the data receiving operation is continued (S704), and the process waits for the completion of the data receiving operation (S705).

If the data receiving is not complete yet, then the process repeats the steps from S702.

When all data has been received, the data reception closing operation is performed (S706), and it is determined whether the received data should be printed out or not (S708).

If it is required to print the received data, then the printing-out operation is performed (S709), and all receiving operations are complete (S712).

Figure 12:
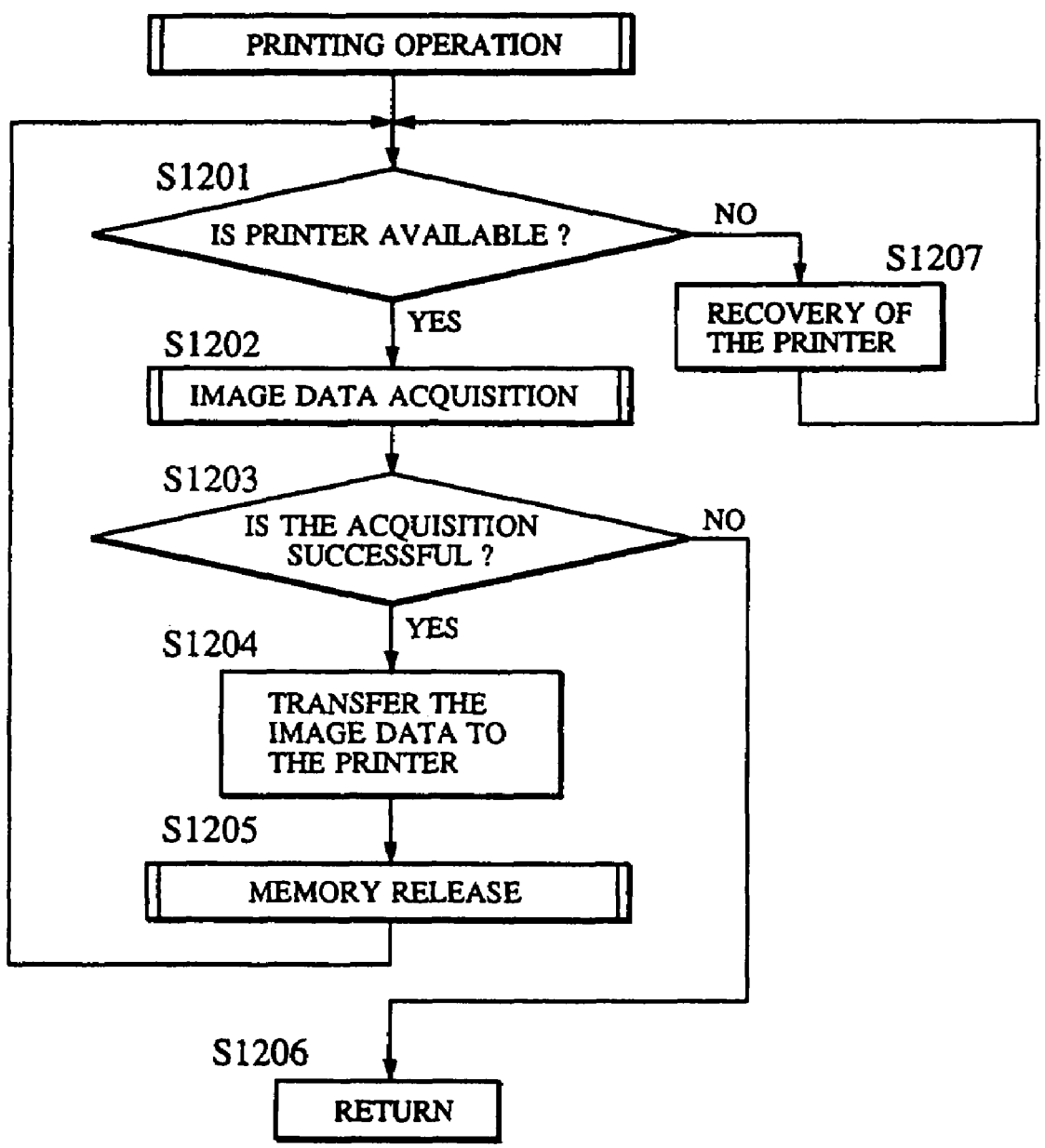

Referring to FIG. 12, the printing-out operation S709 will be described in greater detail.

In step S1201, the status of the printer 215 is examined. If the printer 215 is in a normal status and available, then the image data to be transferred to the printer 215 is acquired (S1202).

Figure 14:
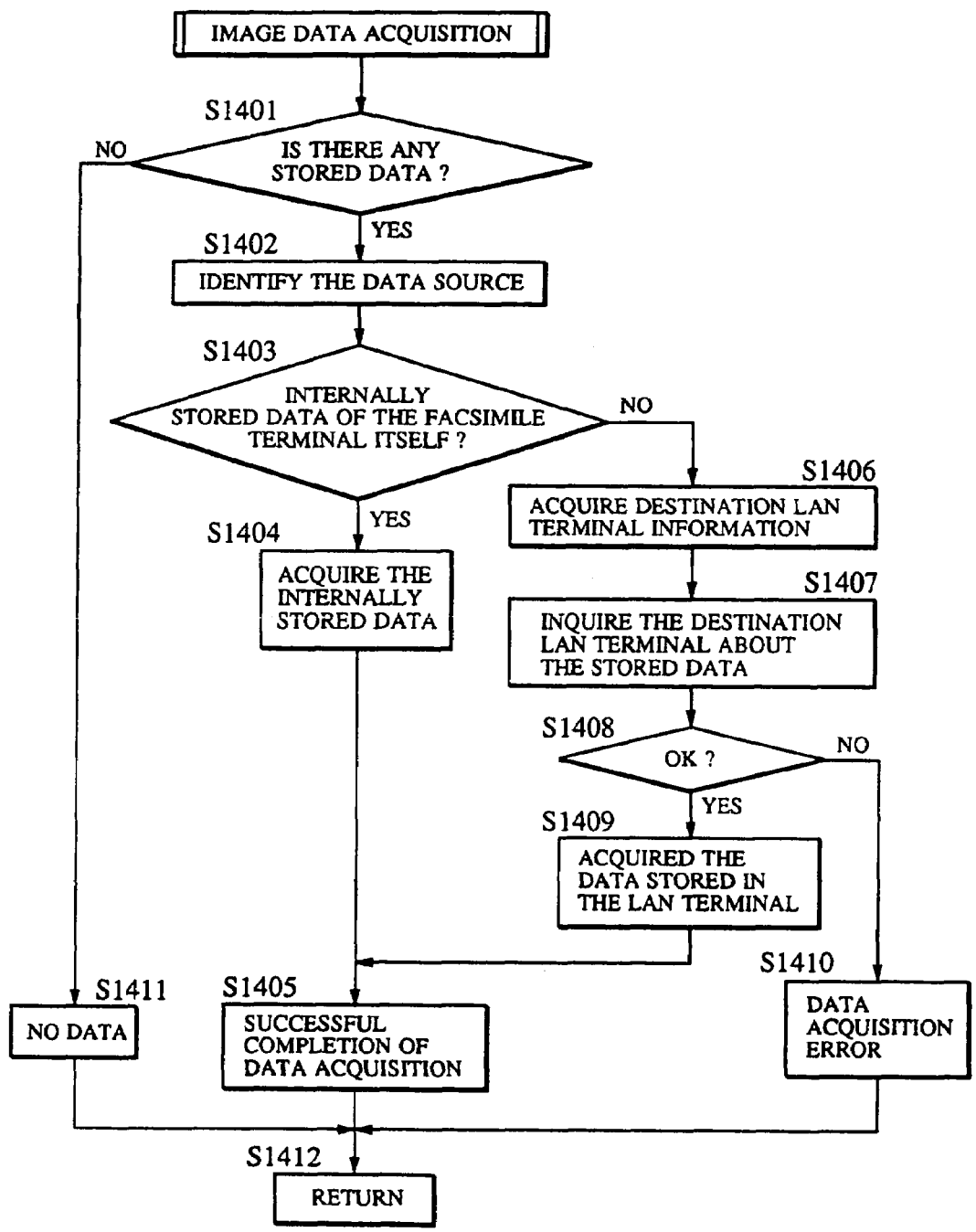

Referring to FIG. 14, the image data acquisition process S1202 will be described further.

First, whether there is stored data or not is determined by judging whether the stored-data start location pointer 1605 correctly points stored data (S1401). If there is no stored data, the image data acquisition process S1202 returns to the main process with a result indicating no stored data (S1411, S1412).

If it has been concluded in step S1401 that there is stored data, then the data source associated with the memory is identified (S1402) from the information stored in the memory type 1608, and it is determined whether the stored data resides in the image data memory 204 of the LAN-FAX 101 itself or not (S1403).

If the stored data resides in the image data memory 204 of the LAN-FAX 101 itself, then the stored data is acquired from the image data memory 204 (S1404). Thus, the image data acquisition process has been completed successfully, and processing returns to the main process (S1405, S1412).

In the case where the stored data does not reside in the image data memory 204 of the LAN-FAX 101 itself, the terminal information associated with the MAC address of a LAN terminal in which the stored data resides is acquired from the MAC-address-of-data-transfer-destination 1609 (S1406). Then, inquiry is made as to whether the LAN terminal has the stored data (S1407).

If yes, then the stored-data is acquired from the LAN terminal (S1409), and the process returns to the main process with a successful result (S1405, S1412).

On the other hand, if the result of the above inquiry about the stored data is negative, then the process returns to the main process with a result representing a data-acquisition error (S1410, S1412).

If the image data has been acquired successfully in step S1202, then the image data is transferred to the printer 215 (S1204). After the successful completion of the transfer, the memory is released (S1205), and step S1201 and the subsequent steps are continued. If there is no image data or if it is impossible to acquire image data, then the printing-out process simply returns to the main process (S1206).

If it has been concluded in step S1201 that the printer 215 is not in a normal status, then the process waits for the recovery of the printer 215 (S1207).

Figure 15:
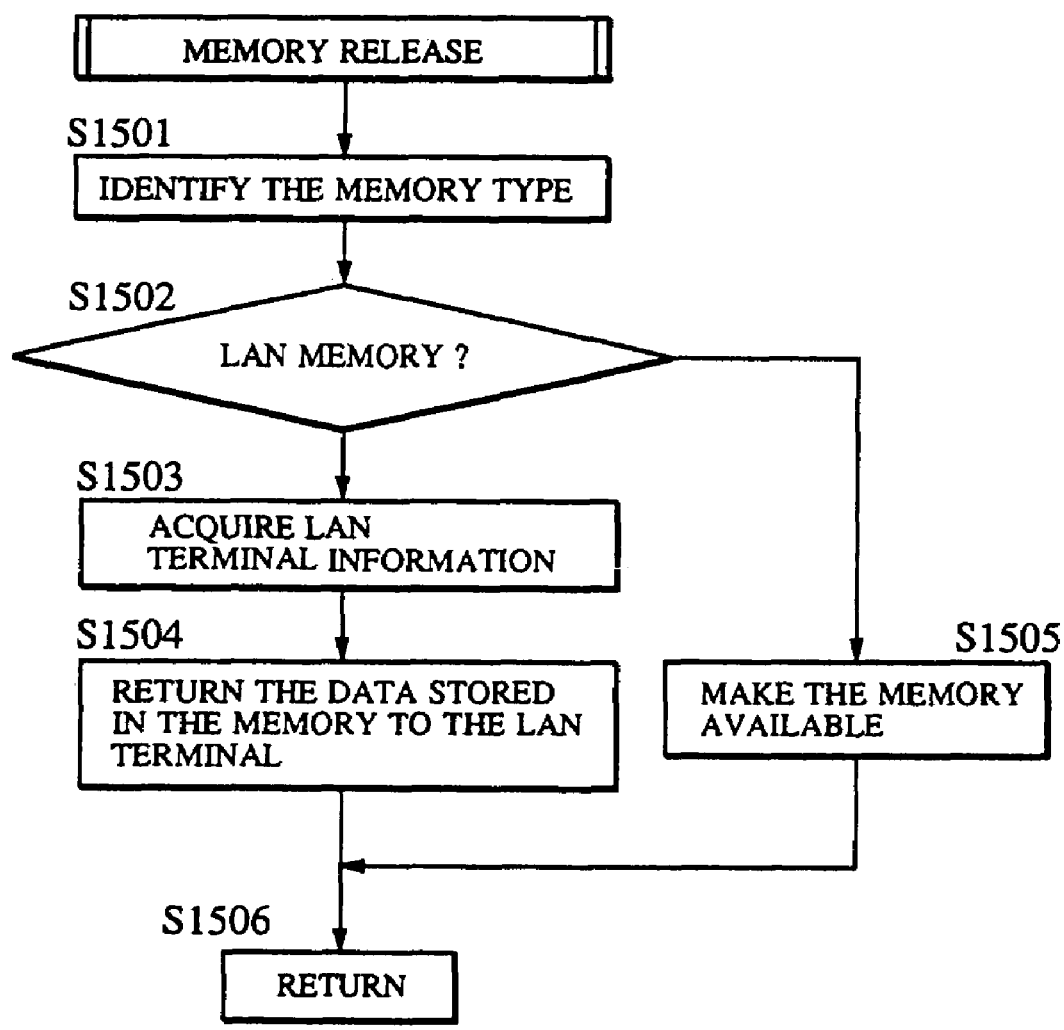

Referring to FIG. 15, the memory releasing process S1205 will be described below in more detail.

The data source associated with the memory is identified (S1501) from the information stored in the memory type 1608, and it is determined whether the stored data resides in a LAN terminal memory (S1502).

If it has been concluded in step S1502 that the stored data resides in the LAN terminal memory, the MAC address of the LAN terminal to which the data was transferred is acquired from the MAC-address-of-data-transfer-destination 1609 (S1503). After sending a message to the LAN terminal saying that the memory will be released (S1504), the stored-data management information is linked to the unused stored-data management-information end pointer 1704. Then, the memory releasing process returns to the main process (S1506).

On the other hand, if it has been concluded in step S1502 that the stored data does not reside in the LAN terminal memory, then the status of the memory managed by the LAN-FAX 101 itself is changed to an unused status (S1505), and then the stored-data management information is linked to the unused stored-data management-information end pointer 1704. Then, the memory releasing process returns to the main process (S1506).

If it has been concluded in step S708 of FIG. 7 that it is not required to print out the received data, then it is determined whether the received data is required to be transferred to a LAN terminal (S710).

If the received data is required to be transferred to the LAN terminal, the received data is transferred to the LAN terminal in step S711, and thus the entire receiving process is complete (S712).

Figure 13:
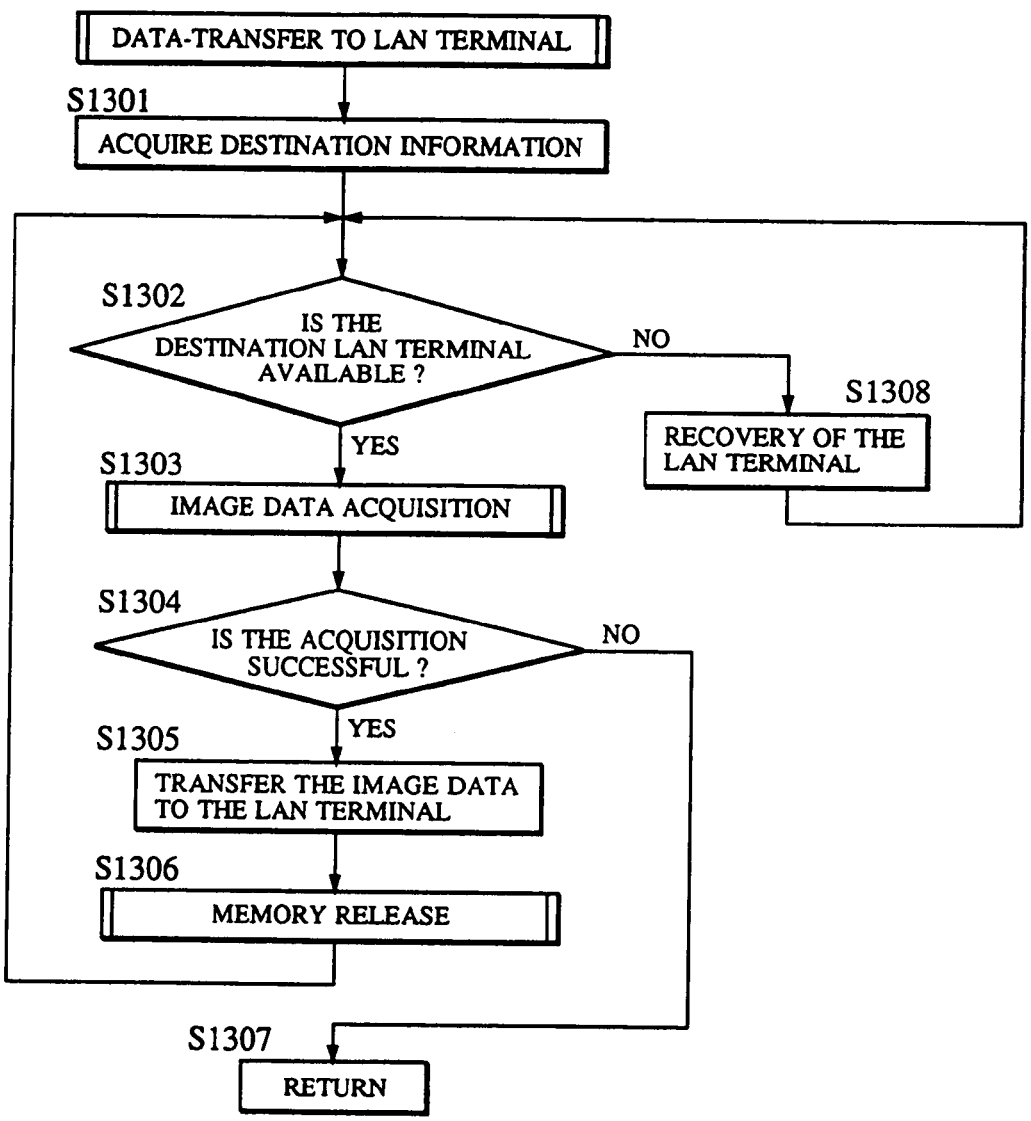

Referring to FIG. 13, the process S711 of the data transfer to a LAN terminal will be described below in more detail.

The information such as the MAC address of a LAN terminal to which the data is to be transferred is acquired from the MAC-address-of-data-transfer-destination 1609 (S1301). The status of the LAN terminal is examined in step S1302. If the LAN terminal is in a normal status, then the image data to be transferred is acquired (S1303). The image data acquisition process in step S1303 is essentially the same as that in step S1202 shown in FIG. 12, and therefore it will be not described here again.

If the image data has been acquired successfully in step S1303, the image data is transferred to the LAN terminal (S1305). After the successful completion of the data transfer, the memory is released, and step S1201 and the subsequent steps are continued.

The memory releasing process S1306 is essentially the same as that in step S1205 shown in FIG. 12, and therefore it will be not described here again.

In step S1304, if there is no image data or if it is impossible to acquire image data, then the process simply returns to the main process (S1307).

In step S1302, if the LAN terminal is not in a normal status, then the process waits for the recovery of the LAN terminal (S1308).

If the received data is not required to be transferred to the LAN terminal, then the entire receiving process is complete (S712).

In the third embodiment described above, even if the available space in the image data memory 204 of the LAN-FAX 101 has become insufficient, received data can be stored in memory of another apparatus connected to the LAN. Therefore, it is possible to continue the data reception without a break or a communication delay.

Furthermore, since the LAN-FAX 101 has the capability of managing the information such as the location where the stored data resides, the page number, the data amount, an operator can easily know the present situation.

The present embodiment also allows the LAN-FAX 101 to perform high-capacity communication without expanding the image data memory 204 in the LAN-FAX 101 itself.

Fourth Embodiment

In a fourth embodiment described below, memory transmission is achieved according to a method similar to that in the third embodiment.

Figure 9:
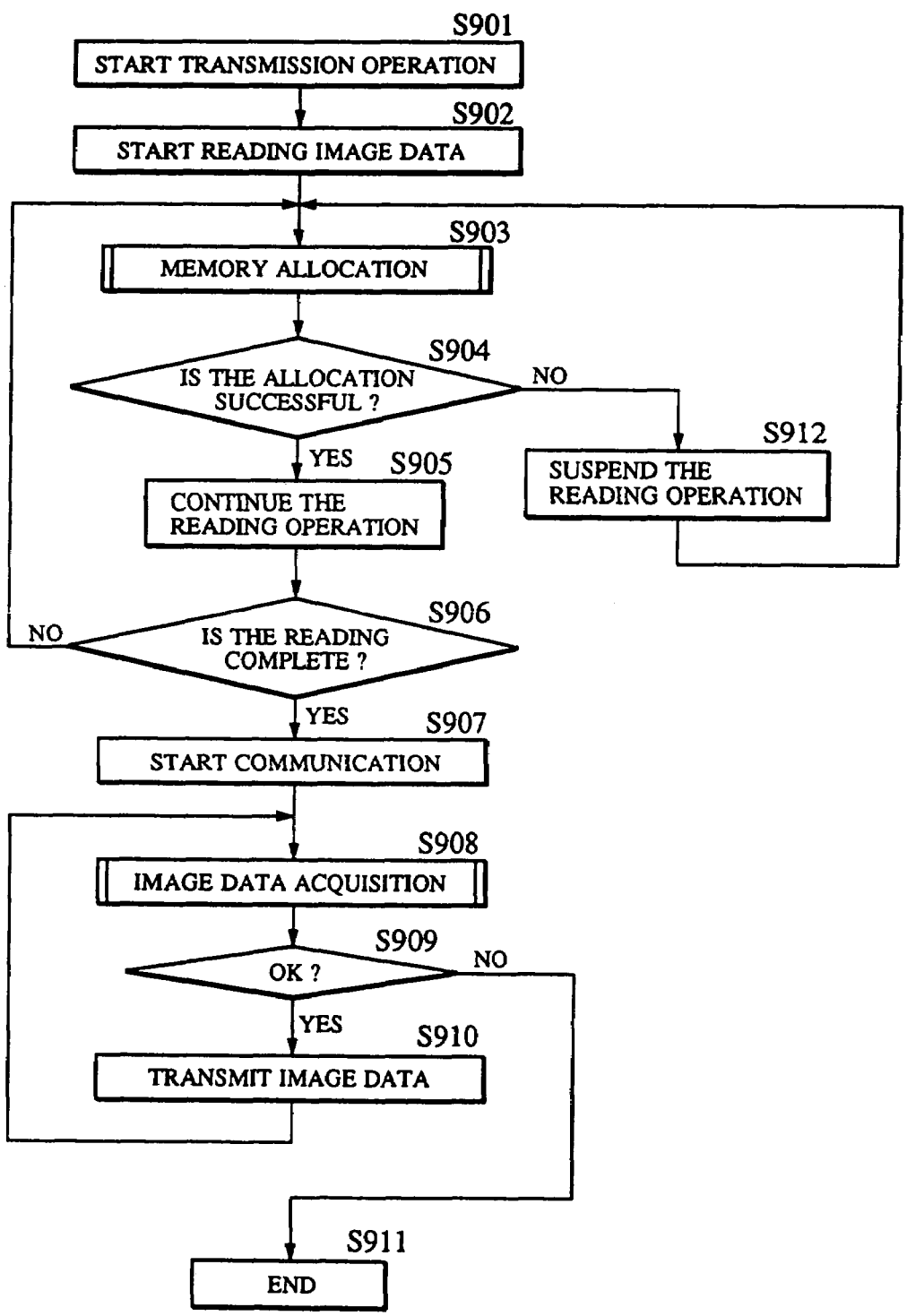

FIG. 9 is a flow chart illustrating the transmission procedure in a LAN-FAX according to the present embodiment of the invention. A transmission process starts at step S901, and the LAN-FAX reads data to be transmitted (S902).

Here, the data to be transmitted includes image data that is read by the scanner 211, data that is sent to the LAN-FAX 101 from another LAN terminal via the LAN I/F 214, etc.

In this LAN-FAX according to the present embodiment, when the reading of the transmission data starts, memory allocation is performed (S903) in parallel to the reading operation so that the transmission data can be stored in the allocated area of the image data memory in the LAN-FAX.

This memory allocation process is shown in more detail in FIG. 10. In step S1001 shown in FIG. 10, the decision result is yes since the process is now in the middle of the transmission operation, and thus the process proceeds to step S1002.

In step S1002 shown in FIG. 10, the availability of memory space in the transmission memory 602 is examined. If there is available memory in it, then the transmission memory 602 is allocated (S1006). However, if there is no available room in the transmission memory 602, the availability of the common memory 604 is examined (S1005). If there is available area in it, then the common memory is allocated (S1006).

If neither the transmission memory 602 nor the common memory 604 has available area, then the process proceeds to the LAN allocation process (S1008) as in the case of the receiving operation. This LAN allocation process is performed in substantially the same manner as in the case of the receiving operation in the third embodiment described above, and therefore the description about it will not be repeated here. In the memory allocation process S903, if the memory allocation has failed, then the data reading operation such as the reading of the image data via the scanner 211 is suspended, and a busy-transmission action is performed (S912). The process waits for successful completion of the memory allocation.

If the memory allocation is successfully complete in the memory allocation process S903, then the data reading operation is continued (S905). The process waits for the completion of the data reading operation in step S906.

If the data reading operation is not complete yet, step S903 and the subsequent steps are repeated.

When the data reading operation is complete, a transmission operation starts (S907), and the data to be transmitted is acquired (S908).

Here, the data acquisition process is essentially the same as that in the receiving operation, and therefore the duplicated description about it will not be given.

If the transmission data has been successfully acquired in the data acquisition process S908, then the acquired transmission data is transmitted according to the communication protocol of the LAN-FAX (S910). Then, steps S908 and the subsequent steps are continued repeatedly.

In the data acquisition process S908, if there is no transmission data, or if the transmission data acquisition has failed, then the entire transmission process is simply terminated (S911).

In the fourth embodiment described above, the transmission operation can be performed without a break in the operation due to lack of the available memory area in the transmission memory. The present embodiment also allows the LAN-FAX 101 to perform high-capacity communication without expanding the image data memory 204 in the LAN-FAX 101 itself.

The communication line to which the LAN-FAX is connected is not limited to the ISDN or PSTN. The LAN-FAX may also be connected for example to an existing digital communication network, a private communication line, or other types of communication lines.

Furthermore, the protocol used in the LAN is not limited to the TPC/IP. Any other type of protocol such as the SPX/IPX may also be employed.

Fifth Embodiment

As described above, when a facsimile apparatus is connected to a LAN, it is possible to detect an error or failure that occurs inside the LAN-FAX. However, an error or failure in the LAN, such as disconnection of a communication cable, has to be detected by a user by means of visual inspection or the like. In this fifth embodiment described here, the LAN-FAX 101 has the capability of detecting such an error in the LAN.

Figure 18:
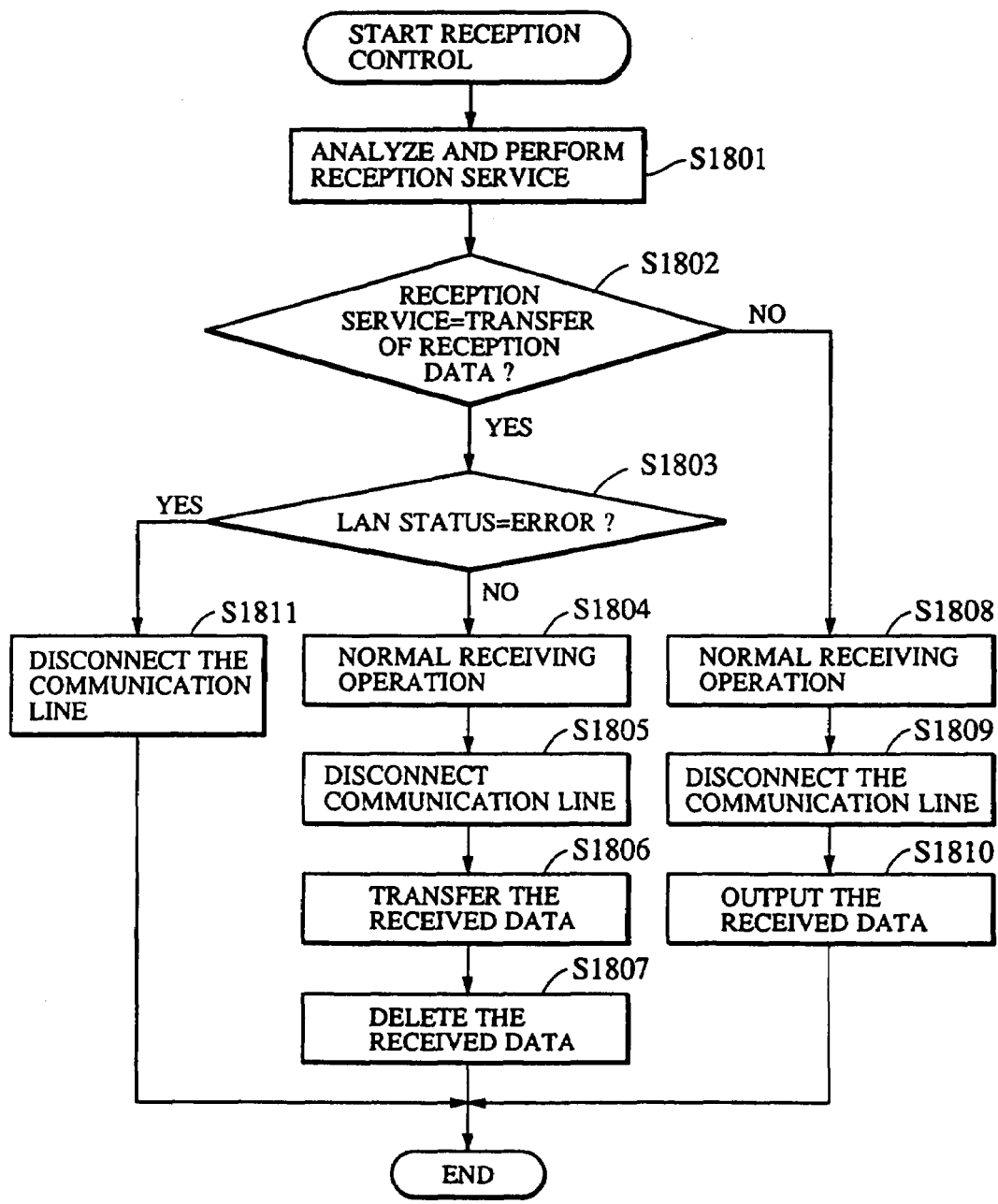
FIGS. 18 and 19 are flow charts illustrating operation flows of a facsimile apparatus according to an embodiment of the present invention.

Referring to the flow chart shown in FIG. 18, the receiving operation of the LAN-FAX 101 according to the present embodiment of the invention will be described.

First, the reception service stored in a frame that has been received at the beginning of a call from a sending station is analyzed (step S1801). In this reception service analysis, the DCS (digital command signal) in a G3-type facsimile, NSF (non-standard function) frame, etc., are analyzed. Based on the analysis result, it is determined whether the requested reception service is a data transfer to a terminal connected to the LAN 100 (step S1802). If data transfer is requested, then it is determined whether the LAN 100 is in an error status or not (step S1803). The status of the LAN is set in such a manner described later referring to the flow chart of FIG. 19. If it has been concluded that there is an error in the LAN 100, then the communication line is disconnected (step S1811), and the receiving operation is terminated. In the case of the G3-type facsimile procedure, the above disconnection of the communication line is performed by sending a DCN (disconnection) command after receiving an NSF and TCF (training check).

In step S1803, if it has been concluded that the LAN 100 is in a normal status, then data is received from a sending station according to the normal receiving procedure (step S1804). After the completion of the receiving operation, the communication line connected to an existing communication network (public telephone network) 102 is disconnected (step S1805), and then the received data is transferred to the server machine 103 from the LAN-FAX 101.

The data transfer to the server machine 103 will be described below in greater detail. First, based on the address of the server machine 103 with respect to the LAN 100, a transfer image (received image) data file is produced. This transfer image data file is configured according to the protocol of the LAN 100 to which the LAN-FAX 101 is connected. In this embodiment, since the protocol of the LAN 100 is defined according to TCP/IP protocol as described above, the transfer image data file is configured according to the TCP/IP protocol. The obtained transfer image data file is sent out via the LAN interface 214 of the LAN-FAX 101 so as to transfer the data file to the server machine 103 via the LAN 100. If a user of the LAN-FAX 101 issues a printing command, a transfer-back request is automatically sent to the server machine 103, and the received image data file that was transferred to the server machine 103 is printed out.

The data configuration according to the TCP/IP has been described above already, and therefore it will not be described here.

After the LAN-FAX 101 has transferred the image data file associated with the received data, the LAN-FAX 101 deletes the received data (step S1807). Then, the receiving operation is complete. In the above deleting process, the transfer image data stored in the image data memory 204 is deleted.

If it has been concluded in step S1802 that the requested reception service is not a data transfer, then the data is received according to the normal receiving procedure (step S1808). Then, the communication line is disconnected (step S1809). After the disconnection of the communication line, the received image data is printed out using the printer 215 (step S1810), and thus the receiving operation is complete.

In the above steps from S1808 through S1810, the operation is the same as in the case of a usual facsimile apparatus that is not connected to the LAN 100, wherein the received data may also be printed out before the completion of the disconnection of the communication line, or the received data may not be printed out depending on the requested service. Furthermore, as for steps S1805 and S1806, step S1806 may be performed first, followed by step S1805, or otherwise, these steps may be performed at the same time.

Figure 19:
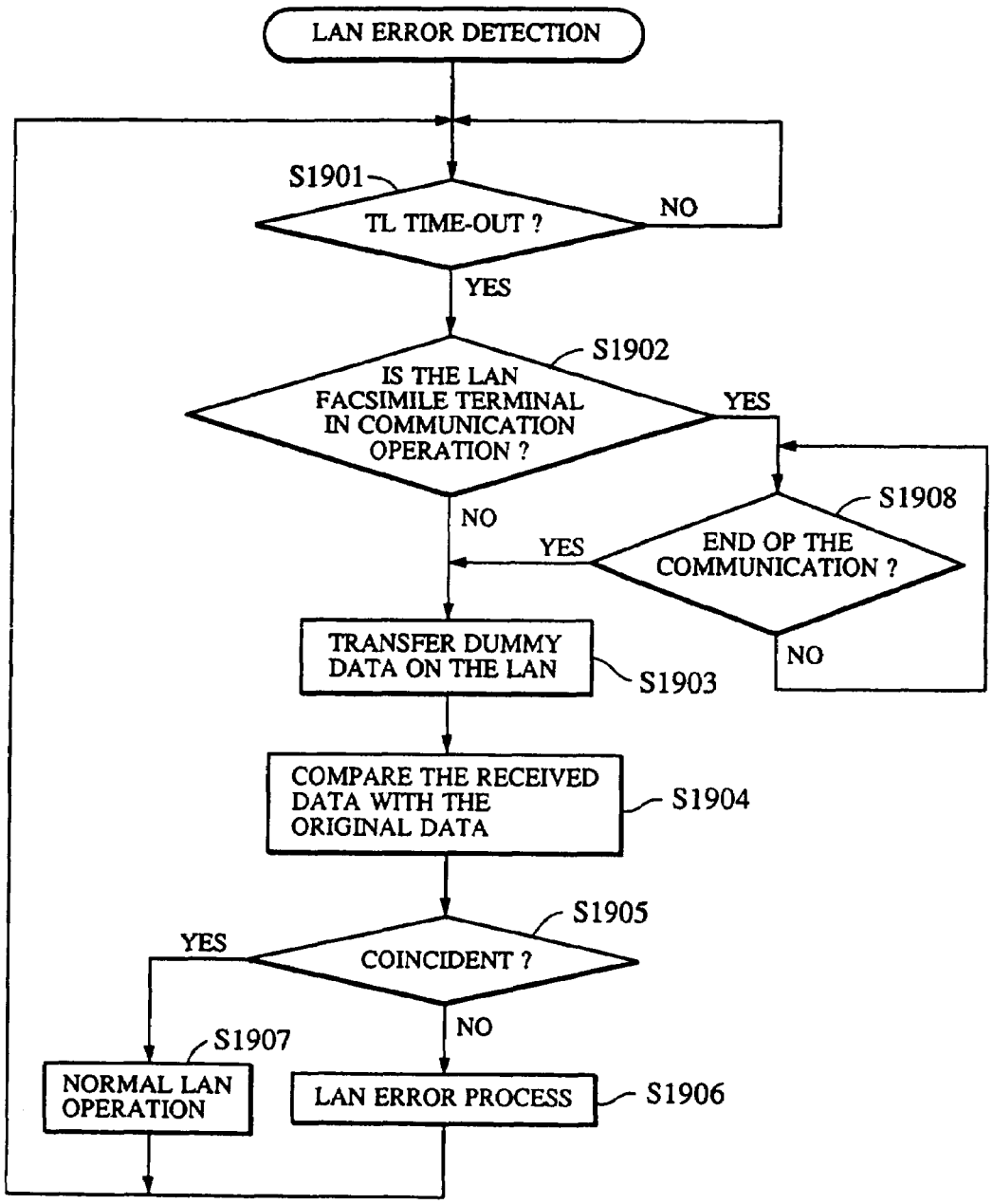

Referring to the flow chart of FIG. 19, the error detection of the LAN 100 will be described.

The error detection of the LAN 100 is performed by the LAN-FAX 101 at time intervals set in a TL timer (step S1901). A user can set the TL timer to an arbitrary interval value. Thus, at the end of each time interval designated by the TL timer, the LAN-FAX 101 determines whether it is in the middle of a communication operation (step S1902). If the LAN-FAX 101 is in the middle of the communication, the error detection of the LAN 100 is performed after the completion of the communication. (step S1908).

If the LAN-FAX 101 is not in a communicating operation, then the error detection is performed immediately. In either case, at the beginning of the error detection process, dummy data or test data is sent to the LAN 100 (step S1903).

A LAN terminal usually has two ports, a transmission port and a reception port, so that both transmitting and receiving operations can be performed at the same time via these two ports. In the present embodiment, it is assumed that the apparatus has the capability of the above-described simultaneous operations. In most LANs such as Ethernet (registered trademark of Xerox), data transmitted by one terminal is sent via a bus-type network to all terminals including the terminal itself that has transmitted the data whereby communication among arbitrary terminals is achieved. In the present embodiment, communication is performed according to this method.

In step S1904, the original dummy data (test data) that was transmitted to the LAN 100 in step S1903 is compared with the data that has returned back to the LAN-FAX 101 after the traveling via the LAN 100. It is determined whether these two data are coincident with each other. (step S1905). If both data are coincident with each other, the LAN 100 is regarded as normal and a normal LAN operation is performed according to a predetermined procedure (step S1907), and then the process returns to step S1901. If there is a difference between the above two data, it is concluded that there is an error in the LAN 100. In this case, a LAN error process is performed according to a predetermined procedure (step S1906), and then the process returns to step S1901.

In the normal LAN operation, information indicating that the LAN 100 is in a normal status is given via the external display 217, or the information indicating that the LAN 100 is in a normal status is directly written in the LAN status without displaying any information on the external display 217. On the other hand, in the LAN error process, information indicating that there is an error in the LAN 100 is given via the external display 217, and the information indicating that the LAN 100 is in a normal status is written in the LAN status. This LAN status is referred to during the receiving operation shown in FIG. 18. As described above, the process periodically returns to step 1901 so as always to provide the newest LAN status to a user.

Figure 20:
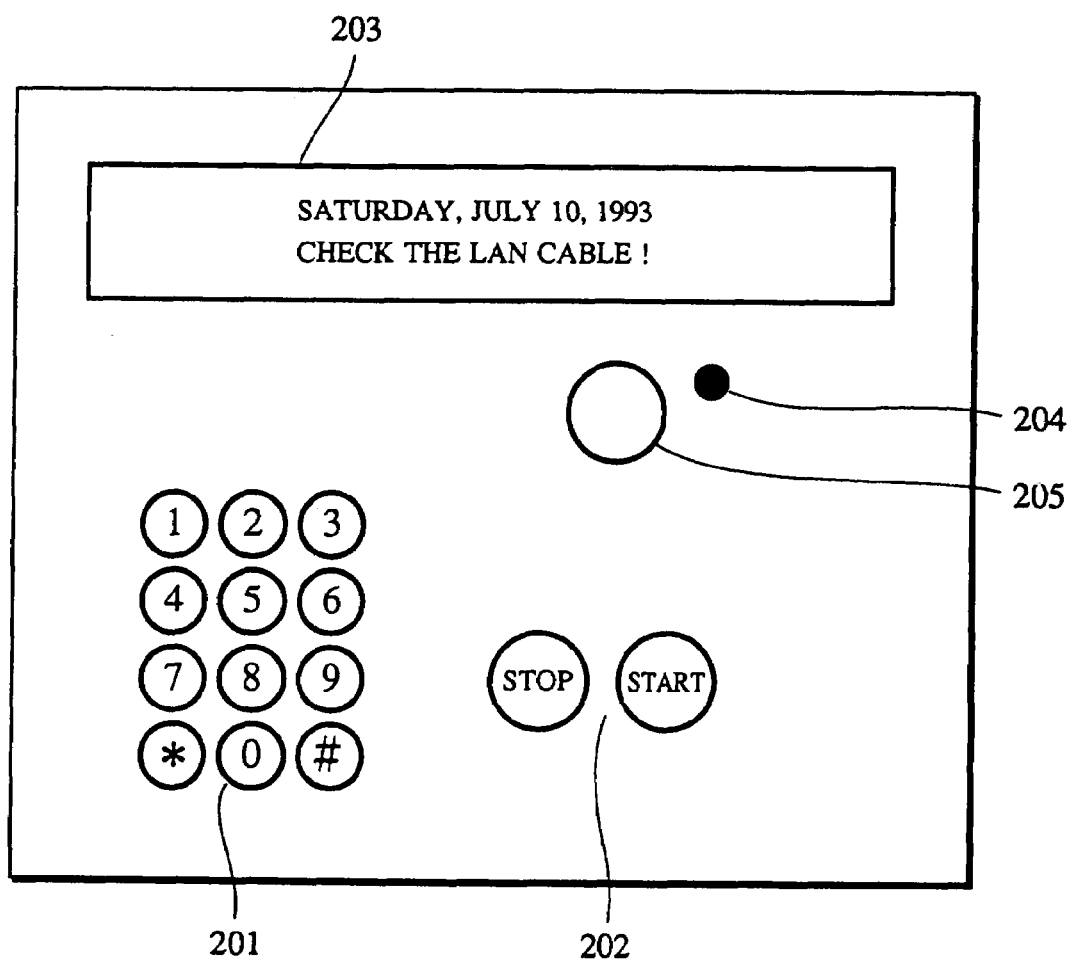
FIG. 20 is a schematic diagram illustrating an example of the configuration of an alarm mechanism in a facsimile apparatus according to an embodiment of the present invention, wherein the alarm mechanism is used to notify a user of LAN conditions.

FIG. 20 is a schematic diagram illustrating an example of an indicator for indicating the LAN status to a user.

In FIG. 20, reference numeral 2001 denotes a ten-key used for inputting particular data associated with for example PB tones or dial pulses, or used for setting the TL timer interval or the error detection time interval, and reference numeral 2002 denotes start and stop keys used for starting or stopping the operation of the facsimile apparatus, wherein elements 2001 and 2002 are parts of the operation panel 212 shown in FIG. 2.

Reference numeral 2003 denotes a message display composed of an LCD or the like, and reference numeral 2004 denotes an LED for indicating the occurrence of an error in the LAN. These elements 2003 and 2004 form the external display 217 shown in FIG. 2. When an error occurs in the LAN, the message display 2003 displays a message indicating what should be done to solve the error, as shown in FIG. 20. Reference numeral 2005 denotes a loudspeaker for generating a sound warning of the occurrence of an error in the LAN.

As long as the LAN status includes information indicating that there is an error in the LAN 100, the message display 2003, LED 2004, and loudspeaker 2005 continue the indication of the occurrence of the error in the LAN. However, if the operation panel 212 is operated, then the LAN-FAX understands that a user has acquired the occurrence of the error in the LAN, and the LAN status changes to a normal status. Thus, the message display 2003, LED 2004, and loudspeaker 2005 stop the indication of the LAN error.

In the receiving operation according to the fifth embodiment, when an error in the LAN 100 is detected, a call to the LAN-FAX is refused. However, the present invention is not limited to this. For example, the LAN-FAX may accept a call containing data that is requested to be transferred without refusing it, and may print out the data instead of transferring it. In this case, if it has been concluded in step S1803 of FIG. 18 that the LAN status indicates an error, steps 51808 through S1810 are performed. Furthermore, if the image data memory 204 has a large capacity, the received data may be stored in the memory 204 without printing it out. The information about the above result is given to a data source station as well as the LAN-FAX 101.

In the receiving operation according to the fifth embodiment, the type of service on the received image data is designated by the service information stored in the NSF frame. However, the designation method is not limited to this.

For example, a password is stored in a password (PWD) frame according to the prescription of the ITU-T, so that the LAN-FAX 101 converts the password to service information or the address to which the received data is to be transferred. Furthermore, the existing communication network is not limited to the public telephone network. A digital communication line such as the ISDN may also be employed. In this case, the type of the service on the received image data may be designated by a command or a control document such as CSS, CDCL, CDS, etc., used in the G4-type facsimile.

Furthermore, in the fifth embodiment, the protocol of the LAN is defined according to the TPC/IP. Alternatively, another type of protocol such as the SPX/IPX may also be employed.

In the fifth embodiment, the LAN-FAX 100 gives a warning of the occurrence of an error to a user by means of a visual or audible expression. Alternatively, the LAN-FAX 101 sends an audio signal or data to a system manager or an administrative system server via an existing communication line so that a proper action to eliminate the error can be taken.

According to the fifth embodiment of the invention, as described above, there is provided a facsimile apparatus connected to both an existing communication line and a LAN, that has the capability of detecting an error in the LAN thereby allowing a user to do proper action for the error. That is, the facsimile apparatus according to the present embodiment has the capability of monitoring the occurrence of an error in the LAN at periodic intervals set to an arbitrary value by a user. Furthermore, when an error occurs in the LAN, information of the error occurrence is given to a user, thereby allowing the user to properly deal with the error before starting the operation of the facsimile apparatus. Thus, the facsimile apparatus according to the present embodiment of the invention provides an excellent user interface.

Furthermore, if the facsimile apparatus receives a call when there is an error in the LAN, the type of received data is determined. If the data transfer is requested, then the facsimile apparatus refuses the reception of the call thereby preventing the memory of the facsimile apparatus from being full. Thus, the facsimile apparatus according to the present embodiment of the invention provides improved capabilities.

Sixth Embodiment

In one of techniques known in the art, an external apparatus such as a personal computer is connected to a facsimile apparatus so that the external apparatus issues various commands associated with reading, transmission, or other operations to the facsimile apparatus. However, in the above known technique, the external apparatus that is connected to the facsimile apparatus must have a special capability.

Furthermore, in the case where a plurality of client machines and facsimile apparatuses are connected to a LAN, only a special client machine can issue commands to force the facsimile apparatuses to particular operations.

In view of the above, a sixth embodiment of the invention provides a method that allows a plurality of client machines connected to a LAN to make effective use of a facsimile apparatus.

Referring to the time chart shown in FIG. 21, an example of automatically setting a mode of a LAN-FAX 101 will be described below.

Figure 21:
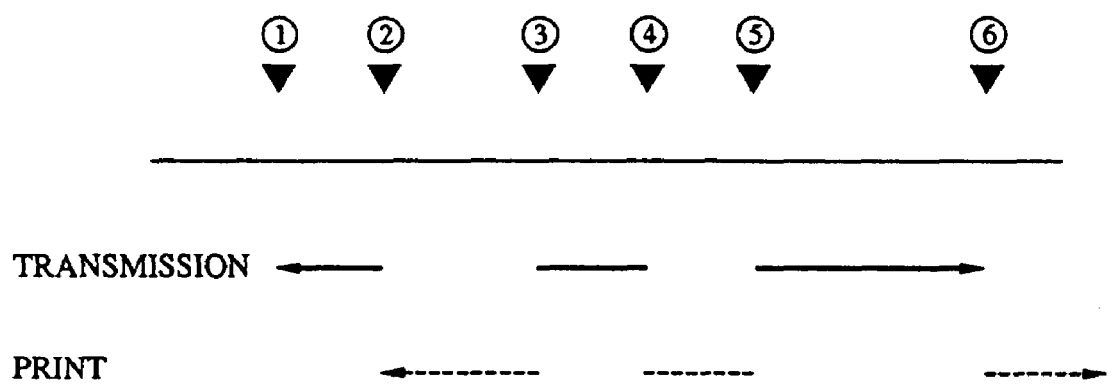
FIG. 21 is a time chart illustrating an example of automatic setting of operation modes in a facsimile apparatus according to an embodiment of the present invention.

If a packet associated with a transmission request is sent from a certain client machine 104 to the LAN-FAX 101 at timing denoted by (1) in FIG. 21, then the operation mode is set to a transmission mode, and the LAN-FAX starts a transmission operation to transmit the packet associated with the transmission request to a designated destination. In this case, as a matter of course, the packet contains a transmission request in its data area. The term "timing" is used here to refer to the timing of the packet according to the TCP/IP protocol that is employed here as the protocol of the LAN 100.

Furthermore, if the LAN-FAX 101 receives another packet associated with a print request from another client machine 104 at timing (2), then the LAN-FAX 101 additionally establishes a print (record) mode and starts a print operation to print the data contained in the packet associated with the print request using the printer 215. In this case, the CPU 201 performs control operations associated with both transmission and print in parallel by means of time-sharing.

After the completion of the transmission of the successive data wherein the data was divided into a plurality of packets and sent to the LAN-FAX 101 from the client at the timing (1), the transmission mode is reset. In this state, at timing (3), if the LAN-FAX 101 has received another packet associated with a transmission request from still another client machine 104, the LAN-FAX 101 is set again so that the LAN-FAX 101 can operate in a transmission mode and a transmission operation is started so as to transmit the packet associated with the transmission request to a designated destination.

In this way, packets are sent in sequence to the LAN-FAX, and the LAN-FAX automatically sets a proper operation mode based on the mode setting information (processing command) contained in the respective packets so as to perform an operation such as communication, printing, or reading corresponding to the mode set above. As for the process commands, standard process commands may be employed, or otherwise, any commands set by a user may also be used. In this way, each client can accomplish a desired operation without being aware of the operation status of the LAN-FAX 101. In this embodiment, furthermore, there is no need to have a personal computer dedicated for the LAN-FAX 101.

Now, process commands provided by each client machine 104 will be described. A client machine 104 that desires to make use of a function of the LAN-FAX 101 (it is assumed here that the client machine 104 is going to make a transmission request) produces a transmission image data file based on the address of the client machine itself with respect to the LAN 100. This transmission image data file is configured according to the protocol of the LAN to which the client machine 104 is connected. More specifically, the protocol of the LAN in this embodiment is defined according to the TCP/IP protocol, and therefore the transmission image data file is configured according to the TCP/IP protocol. The data configuration according to the TCP/IP has been described already earlier, and therefore it is not explained here again.

The data field 2408 includes data such as image data and process commands. Since the maximum data length of this data field 2408 is limited as shown in FIG. 24, when image data or other data is transmitted, a plurality of packets are sent for one process (print process, for example).

In this embodiment, when image data to be transmitted is stored in memory of the server machine 103, it is required to identify its file type, file number, and process mode. For this purpose, a command data header containing the above file information and an image data file containing image data are disposed in the above data field, thereby achieving correct transmission control. The file information contained in the command data header is analyzed by application software for file type analysis installed on the server machine 103, whereby the type of the image file and other information are managed by the server machine 103.

Figure 22:
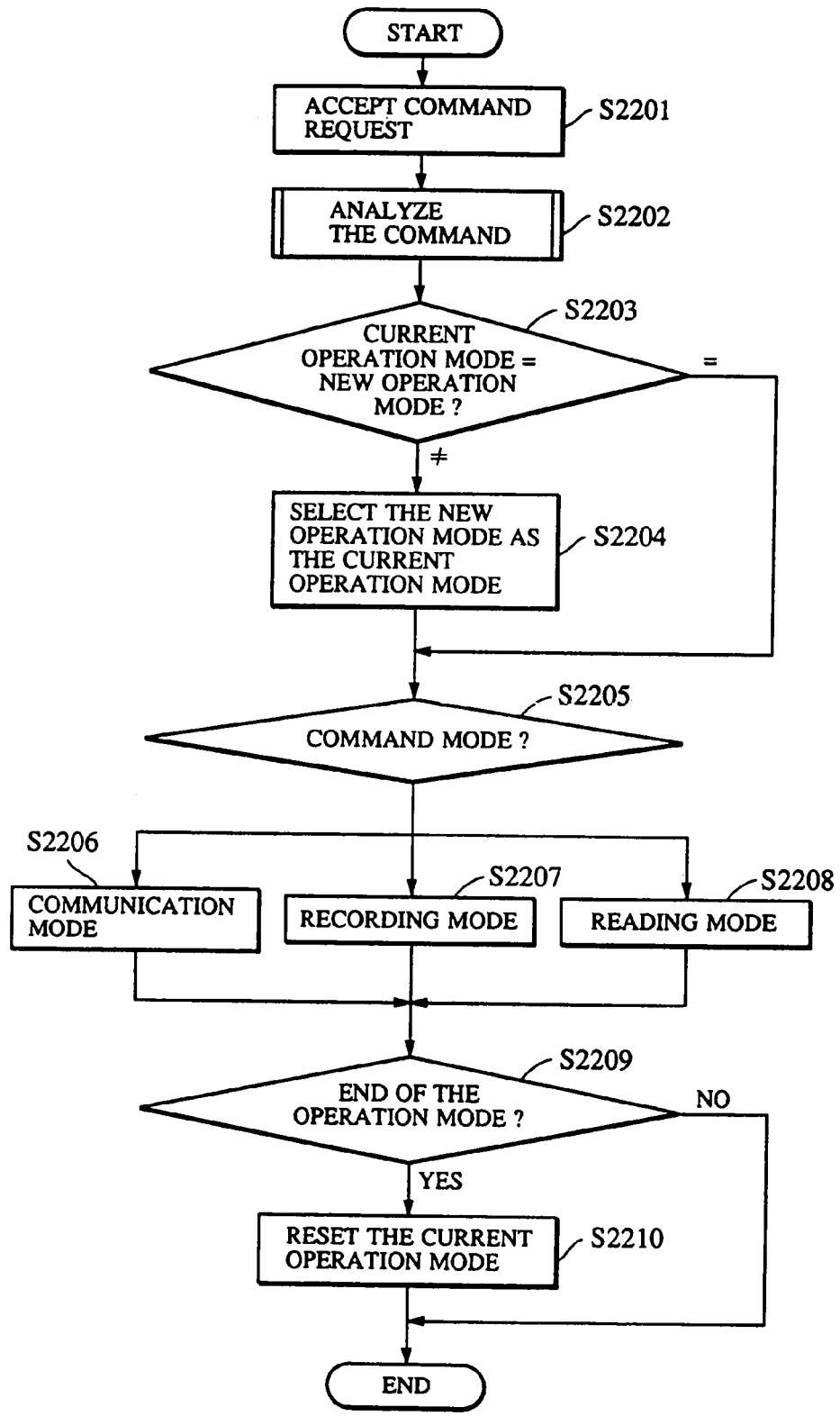
FIGS. 22 and 23 are flow charts illustrating operation flows of a facsimile apparatus according to an embodiment of the present invention.

Referring to the flow chart shown in FIG. 22, the automatic setting of the process mode of the LAN-FAX 101 will be described below.

First, the LAN-FAX 101 receives, via the LAN interface 214, the above file sent from the server machine 103 in the form of packets, and accepts a request represented by a process command (step S2201). Then, the accepted process command is analyzed to determine what operation mode is requested, and the new operation mode is set based on the above analysis result of the process command (step S2202). Thus, the operation mode is set to one of: a communication mode; printing mode; or reading mode.

Then, it is determined whether the new operation mode is coincident with the current operation mode that was set previously (step S2203). Even if both modes are coincident with each other in the above comparison process, the received data will be regarded as invalid data if there is an inconsistency in the address of the client machine 104 (or otherwise if a message is sent to the server machine 103 to tell that the data is unacceptable because the LAN-FAX is busy with another data of the same type).

On the other hand, if the new operation mode is not coincident with the current operation mode that was set previously, the new operation mode is employed as the current operation mode via the selector 218 (step S2204), and then the process proceeds to step S2205. If the new operation mode is coincident with the current operation mode that was set previously, the process proceeds to step S2205 without changing the operation mode.

If the current operation mode is changed to a communication mode, the communication line or the LAN connection is changed via the selector 218 so that the LAN-FAX is connected to the destination to which the data is to be transmitted.

Then, the type of the operation mode corresponding to the process command (associated with the new mode) is detected (step S2205), and an instruction directing that the operation corresponding to the detected mode should start is given (steps S2206-S2208). According to this instruction, if it has been concluded that the new operation mode corresponding to the command contained in the packet is for example a transmission mode, then the data that has been received this time and that is requested to be transmitted is stored in the transmission memory. Thus, the transmission operation starts to transmit the data to another facsimile apparatus via the communication line 102. In the above transmission operation, the data is transmitted via the LAN 100, at a rate of 10 Mbps in the case of the 10-Base-T connection of Ethernet, for example. In contrast, the data is transmitted via the communication line 102 at a rate of 19.2 Kbps. This great difference in the transmission rate allows the communication to be performed smoothly without making the communication line 102 wait for data arrival of data via the LAN 100.

If the operation mode corresponding to the command contained in the packet received this time is a recording mode, then the printer formatter 216 performs data conversion on the data contained in the packets that have been received this type wherein the data is requested to be recorded. When one page of data has been converted, the printer 215 starts a printing operation to print the data (step S2207). On the other hand, if the operation mode corresponding to the command contained in the packet received this time is a reading mode, then a reading operation starts, and the image data that has been read via the scanner 211 is transferred via the LAN interface 214 to the server machine 103 (step S2208).

Then, it is determined whether the command data header of the packet that has been received at this time includes an end-of-mode code declaring the end of the process (step S2209). If there is no end-of-mode code, and thus the end of the process is not declared, then the process is simply complete. On the other hand, if there is an end-of-mode code and thus the end of the process is declared, then the process mode that is declared to be ended, that is the process mode corresponding to the command contained in the packet received this time, is reset so that the process mode can be set to a new mode (step S2210), and then the process is complete.

In this way, the process mode is automatically set based on a process command contained in each packet. In the case where a plurality of process modes are set, the CPU 201 performs control operations associated with the plurality of process modes in parallel by means of time-sharing.

Seventh Embodiment

In the sixth embodiment described above, the process mode is automatically set in turn based on the packet sent from each client machine 104 via the LAN 100. However, since one process is comprised of a plurality of packets, the process mode may also be automatically set to a corresponding mode, and then the process mode may be fixed to it, that is, the process mode is set to a fixed process mode, until one process-has been complete. After the completion of one process, the process mode may be automatically switched to a new mode if necessary.

Figure 23:
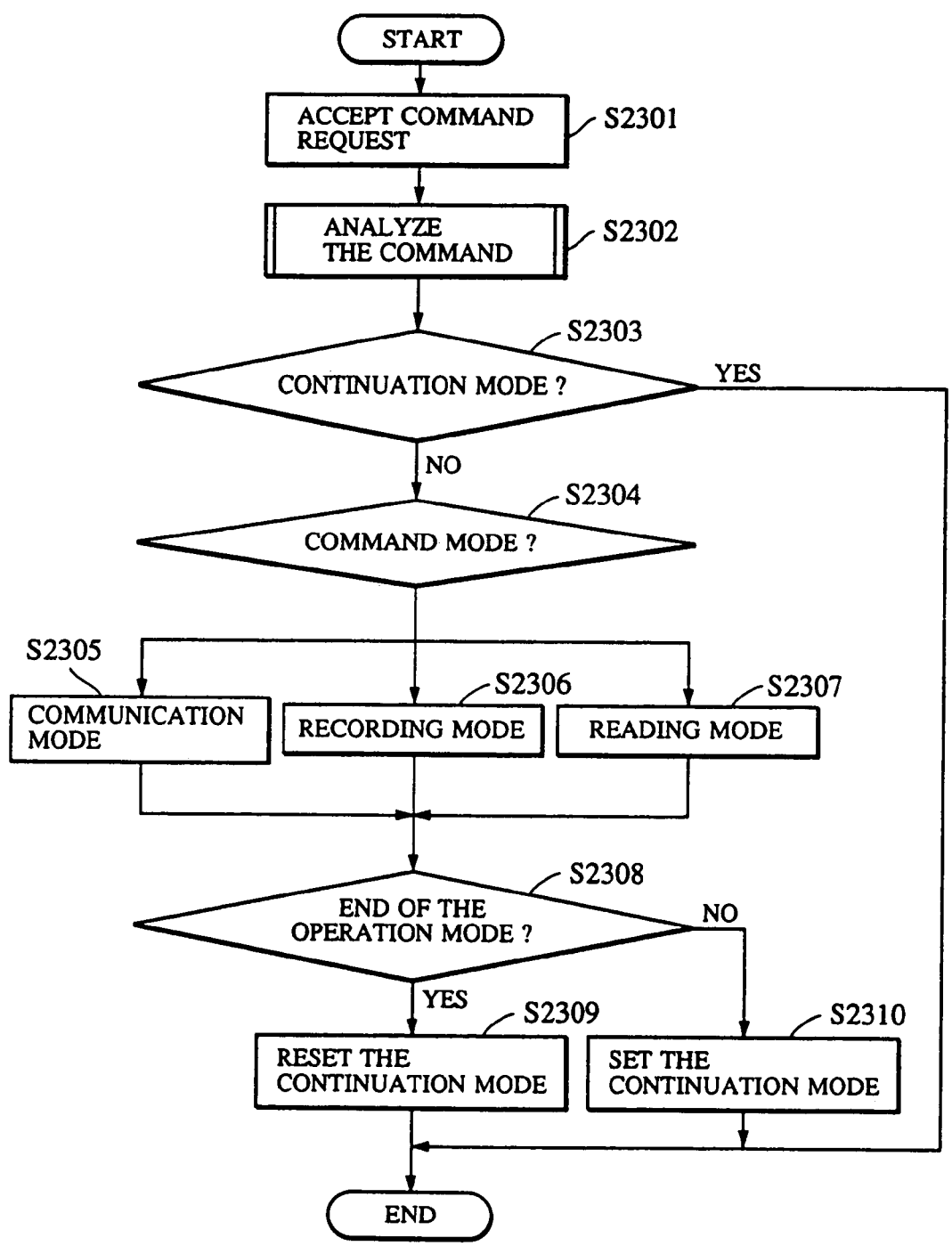

The fixed process mode according to the seventh embodiment of the invention will be described further referring to the flow chart shown in FIG. 23.

In the fixed process mode, the LAN-FAX receives via the LAN interface 214 a file sent in the form of packets from the server machine 103, and accepts a request represented by a process command (step S2301). Then, the accepted process command is analyzed to determine what operation mode is requested, and the new operation mode is set based on the above analysis result of the process command Thus, the operation mode is set to one of: a communication mode; printing mode; or reading mode. (step S2302).

Subsequently, it is determined whether the process mode is a continuation mode or not (step S2303). At the first reception of a packet after the starting of the apparatus and at the first reception of a packet after the completion of one process, the process mode is assumed to be not a continuation mode. At the second reception of a packet, it is determined whether the new mode is coincident with the current mode. If both are coincident with each other, the process mode is set to a continuation process mode. At the third and the subsequent reception of packets, it is determined whether the process mode has been set to a continuation mode or not.

If it has been concluded in step S2303 that the process mode is a continuation mode, then the process is simply complete, and thus the received packet is regarded as an invalid packet. In this case, a message may be sent to the server machine 103 to tell that the data is unacceptable because the LAN-FAX is busy with processing of another data in the same processing mode, and then the process may be complete. Even if the new and current modes are coincident with each other at the second reception of a packet described above, the received data will be regarded as an invalid data if there is an inconsistency in the address of the client machine 104.

On the other hand, if it has been concluded that the process mode is not a continuation mode, then, the type of the process mode corresponding to the process command (associated with the new mode) is detected (step S2304), and the new mode is employed as the current process mode via the mode selector 218. Then, an instruction directing that the operation corresponding to the detected mode should start is given (steps S2305-S2307).

Then, it is determined whether the command data header of the packet that has been received this time includes an end-of-mode code declaring the end of the process (step S2209). If there is no end-of-mode code, and thus the end of the process is not declared, then the process is complete after setting the process mode to a continuation mode. On the other hand, if there is an end-of-mode code and thus the end of the process is declared, then the process mode associated with the command contained in the received packet and the continuation mode are reset so that the process mode can be set to a new mode (step S2309), and then the process is complete.

In this way, the process mode of the LAN-FAX 101 is fixed until one process (transmission process, for example) has been complete. When the next packet has been received after the completion of one process (transmission process, for example), the process mode is set to a new mode corresponding to the process command contained in the received packet.

In the sixth and seventh embodiments, the protocol of the LAN 100 is defined according to the TPC/IP. However, the protocol is not limited only to this, and another type of protocol such as the SPX/IPX may also be employed. Furthermore, in the sixth and seventh embodiments, the process mode is automatically set based on a process command received via the LAN. Alternatively, the process mode may also be automatically set based on a process command received via the communication line 101.

In the sixth and seventh embodiments, the process mode is automatically determined based on process commands described in command headers that are sent sequentially. Alternatively, the priority may be defined for each process mode, and if a process command corresponding to a process mode having high priority has been received during a certain constant time period, this process mode may be employed in preference to other modes. Furthermore, instead of employing the fixed priority of the modes, a user may also set the priority of the modes.

In the sixth and seventh embodiments, as described above, the LAN-FAX includes: an interface via which the LAN-FAX is connected to the LAN; analysis means for analyzing a process command received via the LAN or the existing communication line; mode setting means for setting the process mode so that a process corresponding to the process command analyzed by the analysis means is performed via communication means, recording means, or reading means. In this arrangement, there is no need to have a dedicated personal computer acting as a facsimile server. Furthermore, there is no need for a user to set various modes of the facsimile apparatus via a dedicated personal computer. Thus, it is possible to connect the facsimile apparatus to a LAN in addition to an existing communication line at a low cost, and it is also possible to make effective use of the capability of the facsimile apparatus.

As described above, the present invention provides a data processing apparatus connected to a LAN, that has no problems such as those in conventional techniques, wherein its various capabilities can be used effectively.

While the present invention has been described with reference to specific preferable embodiments, the description is illustrative of the invention and is not to be construed as limiting the invention. It will be apparent to those skilled in the art that various modifications are possible without departing from the true spirit and scope of the invention as defined by the appended claims.

What is claimed is:

1. A data processing apparatus connectable to a LAN, comprising:
   a receiver, adapted to receive image data sent by a sender, said data processing apparatus being set by the sender as a destination of the image data;
   a storage unit, adapted to store the image data received by said receiver;
   a printer, adapted to print an image based on the image data received by said receiver;
   an identification unit, adapted to obtain user information about a user for whom the image data received by said receiver was received;
   a transfer unit, adapted to transfer the image data received by said receiver to be printed by said printer from said data processing apparatus to a terminal connected to the LAN through the LAN when it is impossible to store the image data in said storage unit without printing the image based on the image data received by said receiver by said printer;
   a generation unit, adapted to generate a predetermined notification, based on the user information obtained by said identification unit, to notify the user that the image data has been transferred by said transfer unit from the destination to another destination, the notification including information indicating the terminal to which the image data is transferred by said transfer unit; and
   a sending unit, adapted to send the predetermined notification generated by said generation unit to the user corresponding to the user information obtained by said identification unit as mail.

2. A data processing apparatus according to claim 1, wherein said storage unit is adapted to store information used to discriminate to which terminal the data is transferred by said transfer unit.

3. A data processing apparatus according to claim 1, wherein said transfer unit transfers the data received by said receiver when a printer for printing the data is in an error state.

4. A method of controlling a data processing apparatus connectable to a LAN, comprising the steps of:
- receiving image data sent by a sender, the data processing apparatus being set by the sender as a destination of the image data;
- storing the image data received in said receiving step in a storage unit;
- printing an image based on the image data received in said receiving step;
- obtaining user information about a user for whom the image data received in said receiving step was received;
- transferring the image data received in said receiving step to be printed in said printing step from the data processing apparatus to a terminal connected to the LAN through the LAN when it is impossible to store the image data in the storage unit without printing the image based on the image data received in said receiving step;
- generating a predetermined notification, based on the user information obtained in said obtaining step, to notify the user that the image data has been transferred in said transferring step from the destination to another destination, the notification including information indicating the terminal to which the image data is transferred in said transferring step; and
- sending the predetermined notification generated in said generating step to the user corresponding to the user information obtained in said obtaining step as mail.

5. A data processing apparatus connected to a LAN, comprising:
- a receiver, adapted to receive image data through a communication line from a sender, said data processing apparatus being set by the sender as a destination of the image data;
- a storage unit, adapted to store the image data received by said receiver;
- a printer, adapted to print an image based on the image data received by said receiver;
- a transfer unit, adapted to transfer the image data stored in said storage unit to be printed by said printer from said data processing apparatus to a terminal connected to the LAN through the LAN in a case where a predetermined condition is satisfied without printing the image based on the image data received by said receiver by said printer; and
- a sending unit, adapted to send a report mail indicating that the image data received by said receiver was transferred by said transfer unit from the destination to another destination.

6. The apparatus according to claim 5, further comprising a printer adapted to print an image based on the data received by said receiver, wherein said transfer unit transfers the data in a case where said printer is in an error state.

7. The apparatus according to claim 5, wherein said transfer unit transfers the data received by said receiver in a case where said storage unit is in a full state.

8. The apparatus according to claim 5, wherein said transfer unit transfers the data in accordance with an internet protocol.

9. The apparatus according to claim 8, wherein said transfer unit transfers the data in accordance with a TCP/IP protocol.

10. The apparatus according to claim 5, wherein said transfer unit selects the data to be transferred in accordance with a priority.

11. A method of operating a data processing apparatus connectable to a LAN, said method comprising the steps of:
- receiving image data through a communication line from a sender, the data processing apparatus being set by the sender as a destination of the image data;
- storing the image data received in said receiving step in a storage unit;
- printing an image based on the image data received in said receiving step;
- transferring the image data stored in said storing step to be printed in said printing step from the data processing apparatus to a terminal connected to the LAN through the LAN in a case where a predetermined condition is satisfied without printing the image based on the image data received in said receiving step; and
- sending a report mail indicating that the image data received in said receiving step was transferred in said transfer step from the destination to another destination.

* * * * *

UNITED STATES PATENT AND TRADEMARK OFFICE
CERTIFICATE OF CORRECTION

PATENT NO. : 7,262,871 B2
APPLICATION NO. : 09/908697
DATED : August 28, 2007
INVENTOR(S) : Kazutaka Matsueda et al.

It is certified that error appears in the above-identified patent and that said Letters Patent is

ON THE TITLE PAGE ITEM [54]:

Title, "TRANSFERRED" should read --IS TRANSFERRED--.

SHEET 2:

Figure 2, "CONCRSION" should read --CONVERSION--.

Figure 5:
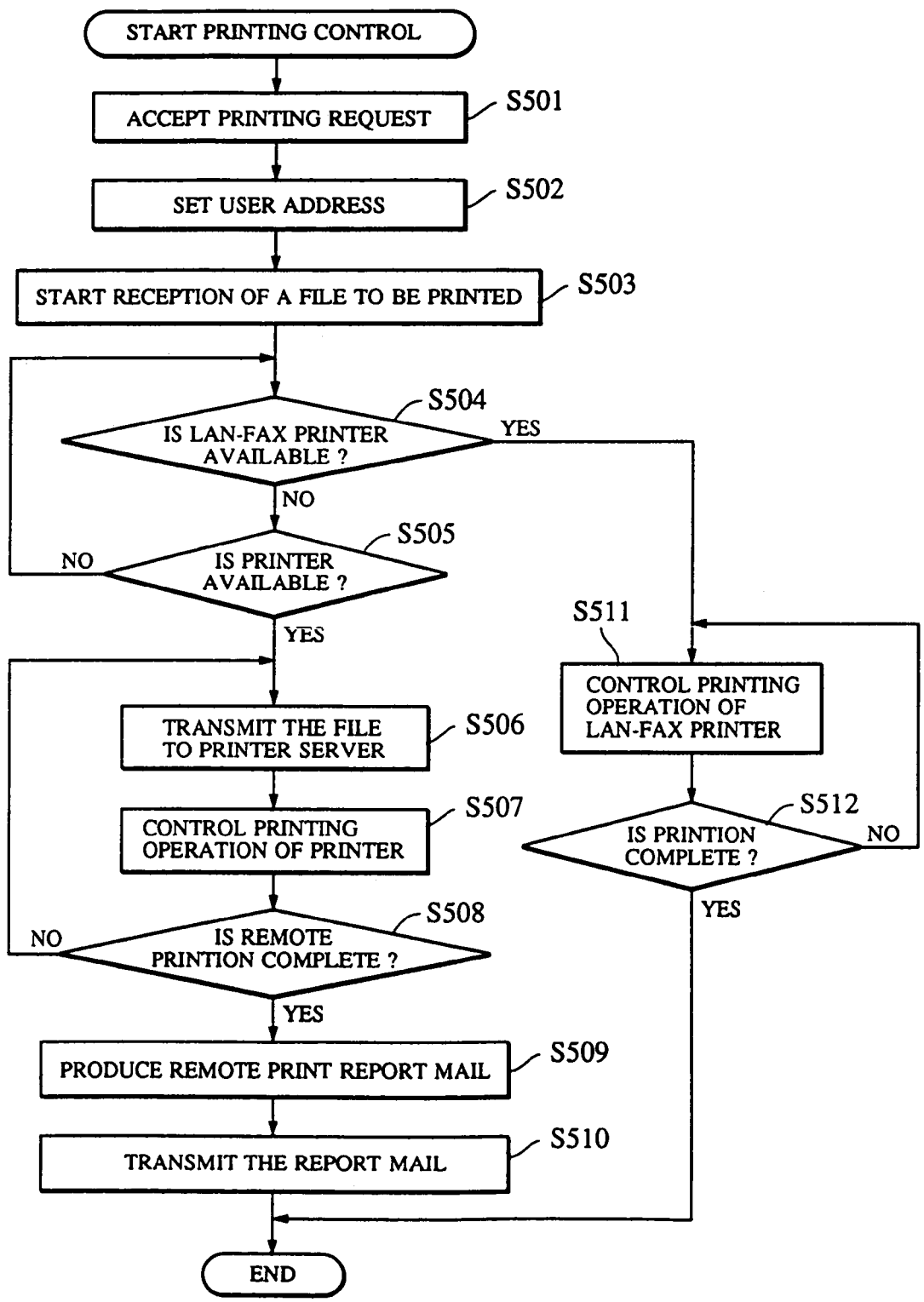

SHEET 5:

Figure 5, "PRINTION" (both occurrences) should read --PRINTING--.

SHEET 8:

Figure 8, "LINT-BUSY" should read --LINE-BUSY--.

COLUMN 1:

Line 3, "TRANSFERRED" should read --IS TRANSFERRED--.

COLUMN 2:

Line 56, "to a" should read --to as a--.

COLUMN 4:

Line 50, "file,a" should read --file, a--.

COLUMN 8:

Line 19, "refer" should read --referred--; and
Line 46, "determined" should read --determine--.

COLUMN 9:

Line 18, "LAN-FAX 10" should read --LAN-FAX 101--.

UNITED STATES PATENT AND TRADEMARK OFFICE
CERTIFICATE OF CORRECTION

| | |
|---|---|
| PATENT NO. | : 7,262,871 B2 |
| APPLICATION NO. | : 09/908697 |
| DATED | : August 28, 2007 |
| INVENTOR(S) | : Kazutaka Matsueda et al. |

It is certified that error appears in the above-identified patent and that said Letters Patent is hereby corrected as shown below:

COLUMN 10:

Line 25, "shorten" should read --shortened--.

COLUMN 12:

Line 50, "an" should read --a--.

COLUMN 13:

Line 10, "step 801." should read --(step 801).--; and
Line 11, "the the" should read --the--.

COLUMN 14:

Line 53, "be not" should read --not be--; and
Line 61, "be not" should read --not be--.

COLUMN 18:

Line 31, "step 1901" should read --step S1901--.

COLUMN 19:

Line 3, "steps 51808" should read --steps S1808--.

COLUMN 22:

Line 47, "process-has" should read --process has--; and "complete." should read --completed.--.

UNITED STATES PATENT AND TRADEMARK OFFICE
CERTIFICATE OF CORRECTION

| | |
|---|---|
| PATENT NO. | : 7,262,871 B2 |
| APPLICATION NO. | : 09/908697 |
| DATED | : August 28, 2007 |
| INVENTOR(S) | : Kazutaka Matsueda et al. |

It is certified that error appears in the above-identified patent and that said Letters Patent is hereby corrected as shown below:

COLUMN 23:

Line 41, "complete." should read --completed.--.

Signed and Sealed this

Seventh Day of October, 2008

JON W. DUDAS
*Director of the United States Patent and Trademark Office*